United States Patent
Yasuda

(10) Patent No.: US 7,822,053 B2
(45) Date of Patent: Oct. 26, 2010

(54) APPARATUS AND METHOD FOR TCP BUFFER COPY DISTRIBUTED PARALLEL PROCESSING

(75) Inventor: Masato Yasuda, Tokyo (JP)

(73) Assignee: NEC Corporation, Tokyo (JP)

( * ) Notice: Subject to any disclaimer, the term of this patent is extended or adjusted under 35 U.S.C. 154(b) by 54 days.

(21) Appl. No.: 12/399,399

(22) Filed: Mar. 6, 2009

(65) Prior Publication Data
US 2009/0225771 A1 Sep. 10, 2009

(30) Foreign Application Priority Data
Mar. 6, 2008 (JP) ............................. 2008-056535

(51) Int. Cl.
*H04L 12/56* (2006.01)
(52) U.S. Cl. ...................... 370/412; 370/392
(58) Field of Classification Search ................. 370/392, 370/389, 503, 412; 709/203, 238, 229, 250, 709/212
See application file for complete search history.

(56) References Cited

U.S. PATENT DOCUMENTS

| 6,826,622 | B2 * | 11/2004 | Maciel | 709/238 |
|---|---|---|---|---|
| 6,985,956 | B2 * | 1/2006 | Luke et al. | 709/229 |
| 7,305,493 | B2 * | 12/2007 | McAlpine et al. | 709/250 |
| 7,535,907 | B2 * | 5/2009 | Hussain et al. | 370/392 |
| 2002/0095471 | A1 * | 7/2002 | Maciel | 709/212 |
| 2004/0030745 | A1 * | 2/2004 | Boucher et al. | 709/203 |
| 2006/0227811 | A1 * | 10/2006 | Hussain et al. | 370/503 |
| 2007/0183418 | A1 * | 8/2007 | Riddoch et al. | 370/389 |

FOREIGN PATENT DOCUMENTS
JP 2005-535226 11/2005

OTHER PUBLICATIONS

D. Clark et al.—"An Analysis of TCP Processing Overhead", IEEE Communications, Jun. 1989.
A. Foong et al.—"TCP Performance Re-visited", IEEE International Symposium on Performance Analysis of Software and Systems, Mar. 2003.

* cited by examiner

*Primary Examiner*—Thong H Vu
(74) *Attorney, Agent, or Firm*—Young & Thompson

(57) ABSTRACT

A TCP buffer copy distributed parallel processing apparatus includes: a TCP reception processing section (TCPRPS); one or more TCP buffer copying sections (TCPBCS); a socket processing section; a reception packet buffer (RPB); and an application buffer. The TCPRPS executes packet receiving and TCP protocol processes. When packet receipt order matches transmission order from a counter host, the received packets are stored in an in-order queue provided in the RPB. Copy destination regions in the application buffer are determined based on TCP sequence numbers of the received packets. A buffer copy request is issued to copy the received packets from the RPB into the application buffer. Any TCP-BCS is selected to send the buffer copy request to the selected TCPBCS, such that buffer copy of the received packets is executed as a distributed parallel process. Out-of-order received packets are stored in an out-of-order queue provided in the RPB.

14 Claims, 17 Drawing Sheets

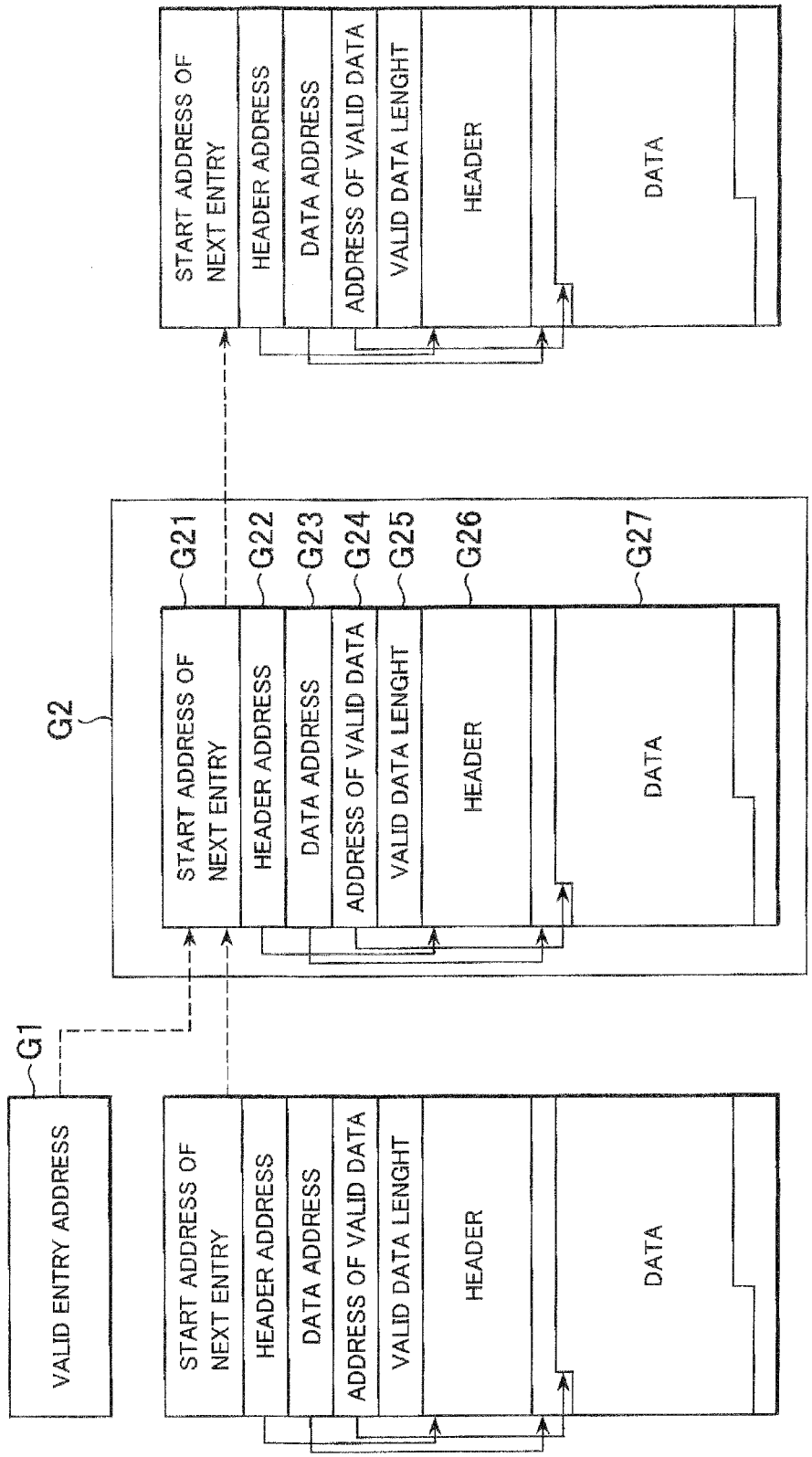

OUT-OF-ORDER QUEUE CONFIGURATION

APPARATUS AND METHOD FOR TCP BUFFER COPY DISTRIBUTED PARALLEL PROCESSING

INCORPORATION BY REFERENCE

This application claims priority on convention based on Japanese Patent Application No. 2008-056535. The disclosure thereof is incorporated herein by reference.

TECHNICAL FIELD

The present invention relates to an apparatus and method for TCP buffer copy distributed parallel processing, and more particularly relates to an apparatus and method for TCP buffer copy distributed parallel processing, in an environment in which a distributed parallel process can be executed, such as multi-core environment, and multi-processor environment.

BACKGROUND ART

In Japanese Patent Application Publication (JP-P2005-535226A: related art 1), a technique for a state-full protocol process at a high data rate is described. In this technique, a message is processed in a state-full, protocol such as TCP, and a high-speed data processing is executed by distributing the message belonging to a single flow to a plurality of protocol processing cores at different times.

Also, "An Analysis of TCP Processing Overhead" (IEEE Communications, June 1989), by D. Clark, V. Jacobson, J. Romkey, and H. Salwen, and "TCP Performance Re-visited" (IEEE International Symposium on Performance Analysis of Software and Systems, March 2003) by A. Foong et al. (related arts 2 and 3) are known. In these papers, it is reported that one of the bottle neck factors in a process of transferring a TCP data lies in a buffer copying process, and not in a portion of the state-full protocol process of the TCP.

In the related art 2, a cost of a process amount per byte transfer of a TCP process is described (p. 27, Table 1) A memory copy from a user space to a system space takes 200 microseconds, a TOP checksum process takes 185 microseconds, and a network memory copy takes 386 microseconds. Since the TCP checksum process and the network memory copy among them is typically executed as an off-load-process in hardware by use of a network interface card, they can be removed from the bottle neck factors. However, the memory copy between the user space and the system space still remains as the severe bottle neck.

On the other hand, in the related art 3, a profiler is used to measure a Load of a Linux kernel process. In a transmitting process request of 64 KByte from a socket, a process rate of the buffer copy and the checksum is 34%, and in a receiving process request of 64 KByte from the socket, the process rate of the buffer copy and the checksum is 41%. That is, the rate of a buffer copying process is higher than the rate of a protocol process.

The following analysis was performed by an inventor of this application. The technique of the related art 1 was specially focused to high-speed packet processing of the state-full protocol process. That is, the technique described in the related art 1 does not assume an operation of re-configuring packet data after a protocol process into an application stream and copying the re-configured data into an application buffer.

According to the related arts 2 and 3, even if the protocol process itself is made higher by using the technique described in the related art 1, the performance of the entire system cannot be improved unless a buffer copying process into an application buffer is made higher. Accordingly, it is necessary to increase the processing speed of the buffer copying process of the packet data after the protocol process into the application buffer. At this time, the following problems may be indicated.

First, a main bottle neck factor in the TCP receiving process is not the TCP protocol process but the buffer copying process to the application stream of the reception packet. Therefore, even if the processing speed of the TCP protocol process is made higher by using multi-core configuration, the performance is not improved in the system level.

Second, in the conventional TCP process, out-of-order data whose reception order is different from a transmission order from a counter host are held in a reception packet buffer until a reconfigurable state is set. After that, when a buffer copy is performed at a timing, the buffer copying process changes to an overload state, so that the system performance falls. This is because of the following reason. That is, when in-order data is received so that an original data can be reconfigured by filling between the out-of-order data, namely, in a time slot of packet reception, the buffer copying process of the in-order data is executed, in addition to a copying process of the out-of-order data.

Third, even if the buffer copying process is made higher by distributing the process into a plurality of blocks, it is difficult to correctly determine whether or not an application stream has been prepared. For example, even if whether or not the application stream has been prepared is determined by summing a value indicative of the completion of the buffer copy and the correct determination cannot be performed when overlapping of the out-of-order data is generated.

Fourth, in case that the buffer copying process is distributed into the plurality of blocks, it is impossible to determine that the application stream has been prepared, even if the buffer copying process to the last portion of the application stream is completed. Since there is a possibility that a specific TCP buffer copying section changes to an overload state so that the processing time becomes longs buffer copy completion notices are not always received in an order of generation of requests of the buffer copy.

SUMMARY

Therefore, a first aspect of the present invention is to improve the processing speed of a buffer copying process of packet data into an application buffer after a TCP protocol process.

Also, another aspect of the present invention is to reduce a total process time by performing buffer copy without waiting for a time when out-of-data after a TCP protocol process becomes reconfigurable, while preventing overload due to buffer copying requests.

Moreover, still another aspect of the present invention is to detect that buffer copying requests have been issued to all regions of an application buffer, even if an overlapping is caused in reception out-of-order data in a distributed parallel process of buffer copy after a TCP protocol process.

In addition, it is an aspect of the present invention to detect completion of buffer copying processes by dynamically allocated blocks in a distributed parallel process of buffer copy after a TCP protocol process.

In an aspect of the present invention, a TCP buffer copy distributed parallel processing apparatus includes: a TCP reception processing section; one or more TCP buffer copying sections; a socket processing section; a reception packet buffer; and an application buffer. The reception packet buffer and the application buffer are storage regions accessible from the TCP reception processing section, the TCP buffer copying sections and the socket processing section. The TCP reception processing section executes a packet receiving process and a TCP protocol process. When it is determined to be in-order in which packets are received in the same order as a transmission order from a counter host, the received packets are stored in an in-order queue provided in the reception packet buffer. Copy destination regions in the application buffer are determined based on TCP sequence numbers of the received packets. A buffer copy request is issued to copy the received packets from the reception packet buffer into the application buffer. Any of the TCP buffer copying sections is selected to send the buffer copy request to the selected TCP buffer copying section, such that buffer copy of the received packets is executed as a distributed parallel process. When it is determined to be out-of-order in which the packets are received in an order different from the transmission order from the counter host, the received packets are stored in an out-of-order queue provided in the reception packet buffer.

In another aspect of the present invention, a TCP buffer copy distributed parallel processing method is achieved: by carrying out a TCP protocol process to received packets; by determining whether or not the received packets are in-order that packets are received in the same order as a transmission order from a counter host; by storing the received packets in an in-order queue provided in a reception packet buffer when the received packets are determined to be in-order; by determining copy destination regions in an application buffer based on a TCP sequence numbers of the received packets; by generating a buffer copy request to copy the received packets from the reception packet buffer into the application buffer; by performing buffer copy processes of the received packets by ones selected from the TCP buffer copying sections distributedly in parallel by notifying the buffer copy request to the selected TCP buffer copying sections; and by storing the received packets in an out-of-order queue, when the received packets are determined to be out-of-order that the packets are received in an order different from the transmission order from the counter host.

In still another aspect of the present invention, a computer-readable recording medium in which a computer-readable program is recorded to realize a TCP buffer copy distributed parallel processing method, is provided. The TCP buffer copy distributed parallel processing method is achieved: by carrying out a TCP protocol process to received packets; by determining whether or not the received packets are in-order that packets are received in the same order as a transmission order from a counter host; by storing the received packets in an in-order queue provided in a reception packet buffer when the received packets are determined to be in-order; by determining copy destination regions in an application buffer based on a TCP sequence numbers of the received packets; by generating a buffer copy request to copy the received packets from the reception packet buffer into the application buffer; by performing buffer copy processes of the received packets by ones selected from the TCP buffer copying sections distributedly in parallel by notifying the buffer copy request to the selected TCP buffer copying sections; and by storing the received packets in an out-of-order queue, when the received packets are determined to be out-of-order that the packets are received in an order different from the transmission order from the counter host.

According to the present invention, first, the buffer copying process of the in-order data after the TCP receiving process is distributed into a plurality of TCP buffer copying sections so as to be executed in parallel. Thus, a process time of the TCP buffer copying process of large process load can be shortened.

Also, since a TCP reception processing section, a TCP buffer copying section and a socket processing section operate asynchronously through an event queue so that pipeline processing by the TCP receiving process, the buffer copying process and the socket process is executed, the high-speed packet process can be attained, as compared with a case of a single process.

In the related arts, the application buffer copying process is waited for a state that the out-of-order data are reconfigurable after reception. Thus, when the stored out-of-order data become reconfigurable through re-transmission of the in-order data, the buffer copying requests are issued so as to change sections for buffer copying processes to overload states. On the other hand, in the present invention, second, when a copy destination of the out-of-order data exists within the application buffer, after the reception of the out-of-order data, the application buffer copying process of the out-of-order data is executed without waiting for the state that the out-of-order data are reconfigurable. Consequently, it is possible to avoid the concentration of load when the out-of-order data is buffer-copied.

In the related arts, data lengths of buffer-copied data are summed and whether or not the application buffer is filled is determined based on the summation result. On the other hand, in the present invention, third, whether or not the application buffer is filled is determined in accordance with rcv_nxt as a TCP parameter, and accordingly, it is possible to determine that the buffer copying requests have been issued to all the regions of the application buffer, even when the overlapping of the out-of-order data is generated, unlike the related arts.

According to the present invention, fourth, it is possible to detect that the buffer copying processes are completed in all the allocated blocks even in case of dynamic allocation, in a distributed parallel and process of the buffer copying process after a TCP protocol process. The completion of the buffer copying process in each of the blocks can be detected from buffer copying process completion notices, after the buffer copying requests have been insured to all the blocks.

BRIEF DESCRIPTION OF THE DRAWINGS

The above and other objects, advantages and features of the present invention will be more apparent from the following description of certain exemplary embodiments taken in conjunction with the accompanying drawings, in which:

FIGS. 5A and 5B are block diagrams showing structures of an in-order queue and an out-of-order queue in the first exemplary embodiment of the present invention;

EXEMPLARY EMBODIMENTS

Hereinafter, a TCP buffer copy distributed parallel processing apparatus according to the present invention will be described in detail with reference to the attached drawings. The TCP buffer copy distributed parallel processing apparatus may be configured in hardware and by executing, by a computer, a software program which is loaded from a recording medium (not shown).

First Exemplary Embodiment

Figure 1:
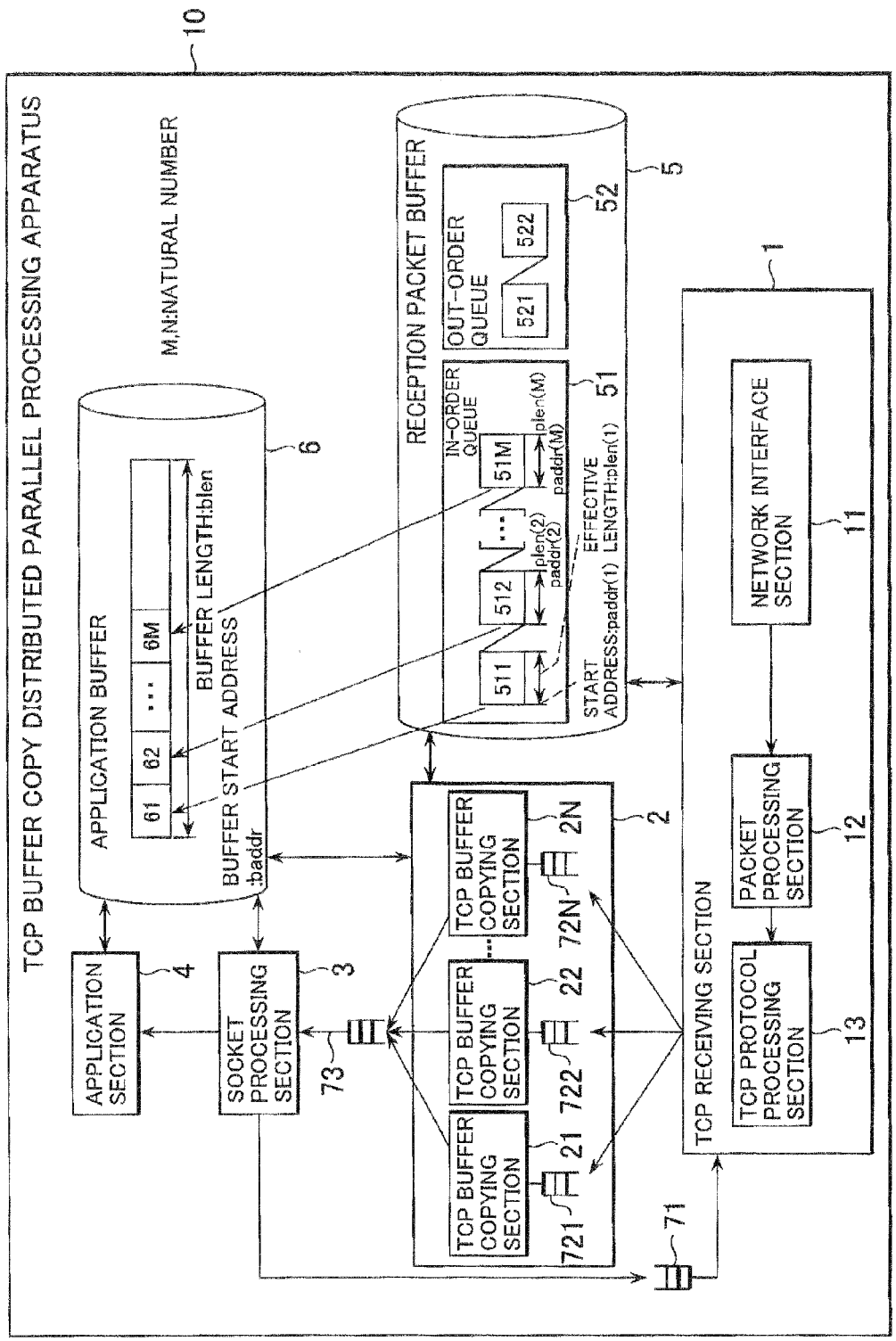
FIG. 1 is a block diagram showing a configuration of a first exemplary embodiment of the present invention.
Figure 2:
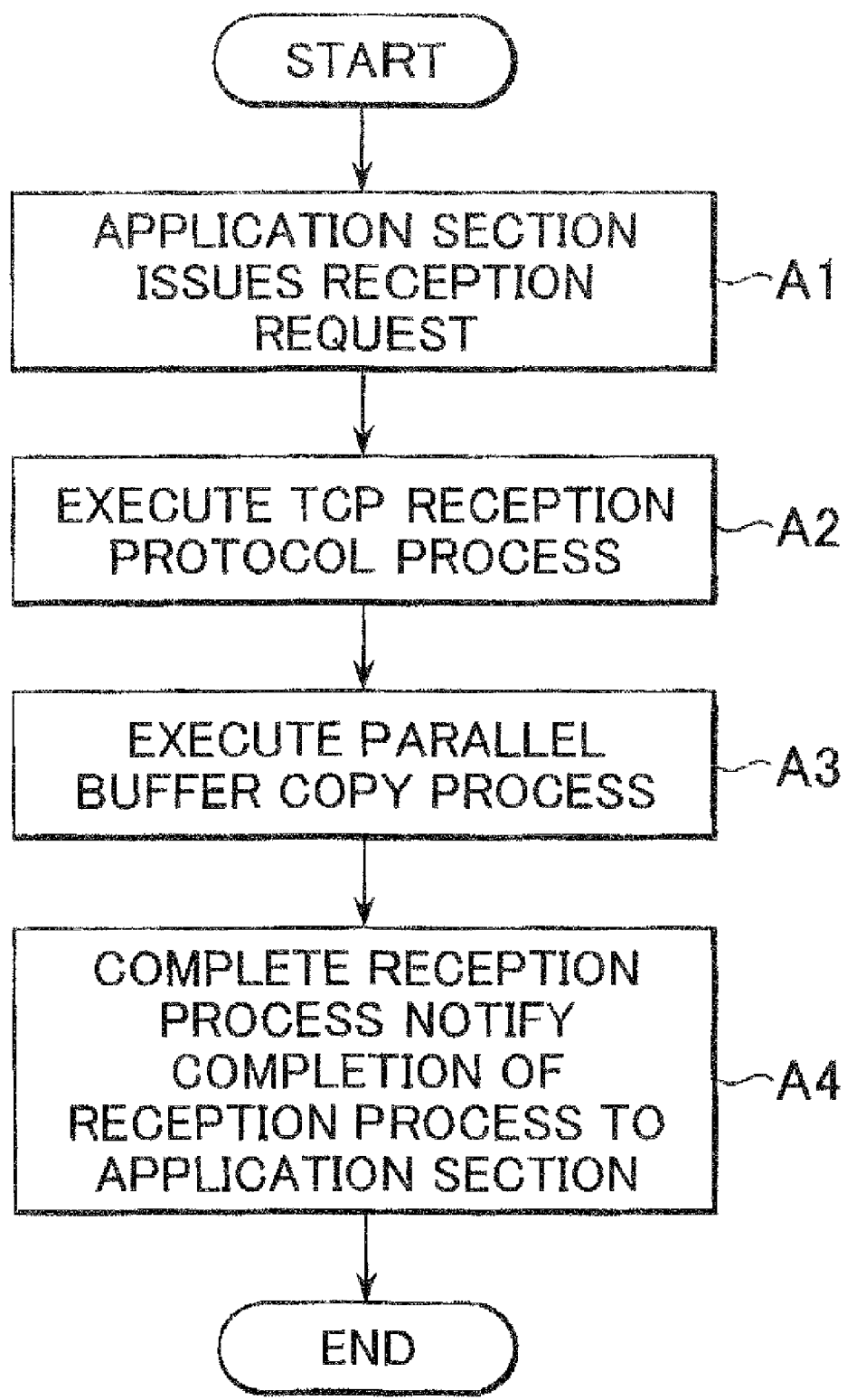
FIG. 2 is a flowchart showing the entire receiving process in the first exemplary embodiment of the present invention.

The TCP buffer copy distributed parallel processing apparatus according to a first exemplary embodiment of the present invention will be described below. With reference to FIG. 1, the TCP buffer copy distributed parallel processing apparatus 10 according to the first exemplary embodiment of the present invention includes: a TCP receiving section 1 for receiving a TCP packet and executing a protocol process, N ($N \geq 1$) TCP buffer copying sections 21 to 2N for copying a reception packet from a reception packet buffer to an application buffer; a socket processing section 3 for executing a socket process; an application section 4 in which an application operates; a reception packet buffer 5 for storing the reception packet; an application buffer 6 for storing a stream data to be transferred to the application; and event queues 71, 721 to 72N and 73 for exchanging commands and data between the TCP receiving section 1, the TCP buffer copying sections 21 to 2N and the socket processing section 3. The reception packet buffer 5 includes an in-order queue 51 for storing in-order data of the TCP, and an out-of-order queue 52 for storing out-of-order data of the TCP.

The in-order data of the TCP are data when TCP packets are determined to have been received in the same order as a transmission order in a counter host, and are a data reconfigurable to a stream. On the other hand, the out-of-order data of the TCP are data when TCP packets are received in an order different from the transmission order because of loss of packets on the route, and are the data which are not reconfigurable to the stream until the reception of the TCP packets corresponding to the loss portion. The in-order queue 51 stores X ($M \geq 1$) packet data 511 to 51M, which are determined to be the in-order data from the received TCP sequence numbers, in a linkage list structure. The out-of-order queue 52 stores the packet data 521 and 522, which are determined to be the out-of-order data from the received TCP sequence numbers, in the linkage list structure, like the in-order queue.

Figure 5B:
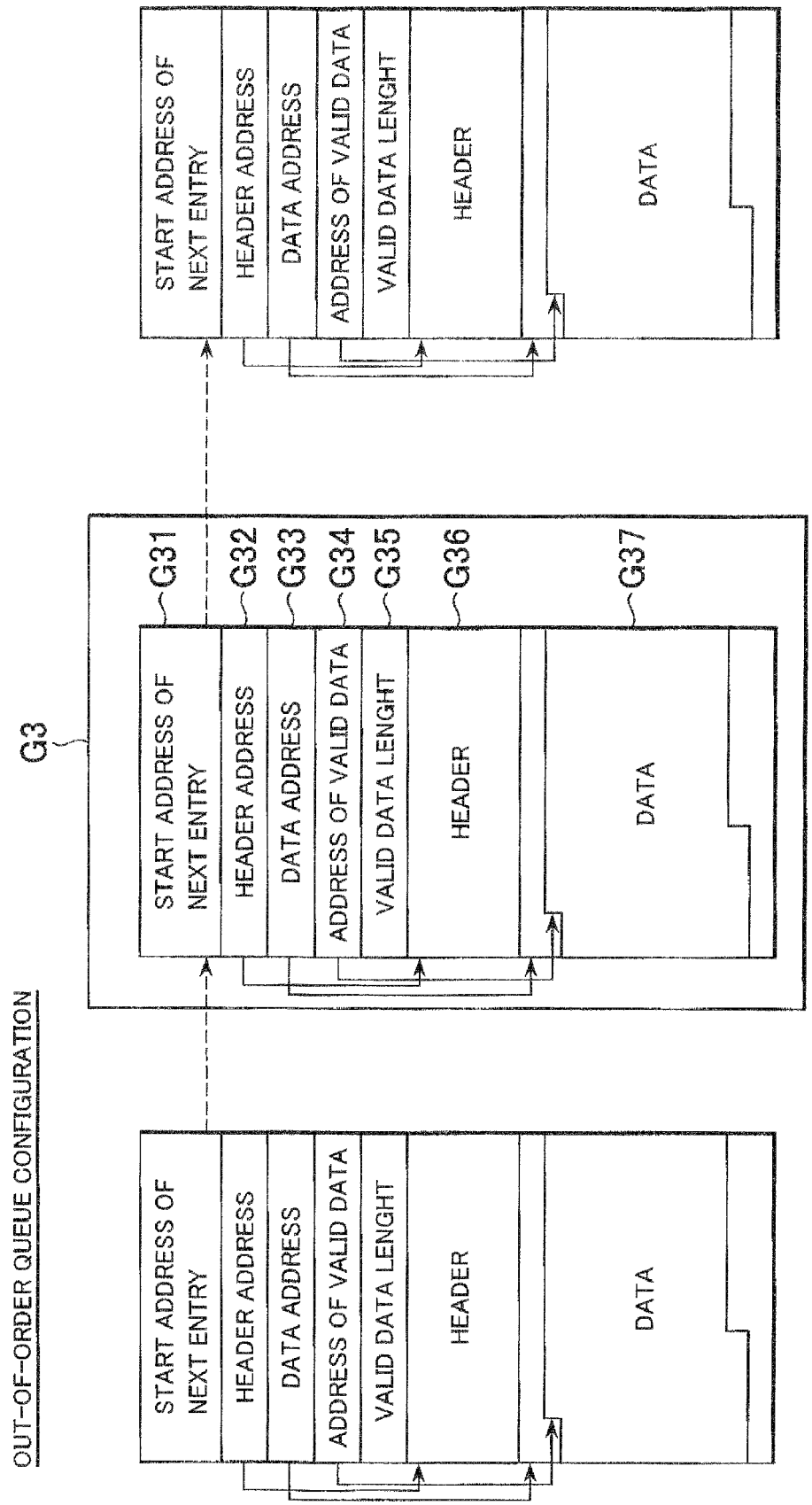

FIGS. 5A and 5B show the configurations of the in-order queue 51 and the out-of-order queue 52. Among the entries of the in-order queue 51, the lead entry in which the buffer copying request is not issued is managed as an address G1 of a valid entry. Also, an entry G2 of the in-order queue 51 has: a start address G21 of a next entry, a header address G22, a data address G23, an address G24 of valid data, a valid data length G25, and a header G26 and a data G27 of a received packet, as the elements.

The start address G21 of the next entry indicates an address of the lead position of the next entry of the queue 51. The header address G22 indicates an address that the header data of the received packet corresponding to the entry G2 is stored.

The data address G23 indicates an address that a payload data of the received packet corresponding to the entry G2 is stored. The address G24 of the valid data indicates a lead address of a region that can be copied to the application buffer 6, in the payload of the received packet. The valid data length G25 indicates the length of a region that can be copied to the application buffer 6, in the payload of the received packet. The header G26 stores a header data of the received packet. The data G27 stores the payload data of the received packet. The data G27 includes a region that can be copied to the application buffer 6, and a region that cannot be copied. The region possible to copy is specified by the address G24 of the valid data and the valid data length G24.

The entry G3 of the out-of-order queue 52 includes G31 to G37 as elements. They have the same functions as G21 to G27 of the entry G2 in the in-order queue 51. Thus, their descriptions are omitted.

The application buffer 6 stores a stream data that is transferred from the socket processing section 3 to the application section 4. The received packets 511 to 51M stored in the reception packet buffer 5 are copied to continuous regions 61 to 61M starting from a buffer start address of the application buffer 6, respectively, after the TCP process. The copied data are transferred to the application section 4, when the stream data has been prepared in the continuous regions for the buffer length from the start address.

The TCP receiving section 1 contains a network interface section 11, a packet processing section 12 and a TCP protocol processing section 13.

The network interface section 11 receives the packets from the counter host and stores the packet data in the reception packet buffer 5. Also, the network interface section 11 transmits the packets to the counter host.

The packet processing section 12 checks the matching of the received packet, carries out session solution of the received packet and extracts header data of the packet. Also, the packet processing section 12 generates a packet data to be sent.

The TCP protocol processing section 13 executes a TCP protocol process of the received packet and executes a process for generating an ACK packet. In the TCP protocol process, the sequence number of the received TCP packet is referred to and whether the received packet is the in-order data or the out-of-order data is determined. If it is determined to be the in-order data, the data of the received packet is added to the in-order queue 51, and if it is determined to be the out-of-order data, the data of the reception data is added to an out-of-order queue 42. Moreover, the TCP protocol processing section 13 generates a TCP buffer copying request to each of the TCP buffer copying sections 21 to 2N.

Each of the TCP buffer copying sections 21 to 2N receives the buffer copying request from the TCP receiving section 1, and executes a copying process from the reception packet buffer 5 to the application buffer 6 in accordance with the received data. Also, each of the TCP buffer copying sections 21 to 2N outputs a buffer copy completion notice to the socket processing section 3, after the copy completion.

In addition to the reception of the request from the application section 4, the socket processing section 3 receives the buffer copy completion notice from each of the TCP buffer copying sections 21 to 2N, and detects whether or not the stream data of the application buffer 6 has been prepared. When the stream data for the buffer length from the buffer start address has been prepared, the socket processing section 3 notifies the completion of the process to the application section 4.

The application section 4 generates a stream data reception request to the socket processing section 3. At that time, the start address and data length of the stream data that is desired to be received are notified to the socket processing section 3. After the reception of the completion notice from the socket processing section 3, the application section 4 can operate the stream data.

The operations of this exemplary embodiment will be described below in detail with reference to FIGS. 1 to 3 and FIGS. 4A to 4C. At first, the operation of the receiving process will be described with reference to FIGS. 1 and 2.

The application section 4 is a program for receiving a data stream from the counter host and executing a process. The application section 4 issues a reception request to the socket processing section 3 in order to obtain the data stream (Step A1) As an example of the reception request, a recv system call of the TCP socket is exemplified. It should be noted that the recv system call is a notifying method of a synchronization type in which the application section 4 waits for preparation of the stream data. However, this may be a notifying method of an asynchronous type in which the application section 4 can execute other processes until the stream data is prepared. The reception request includes a buffer start address baddr and a buffer length blen of the application buffer 6, as arguments.

The TCP receiving section 1, the TCP buffer copying sections 21 to 2N and the socket processing section 3 receive the reception request from the application section 4 and execute the TCP reception protocol process (Step A2) and a parallel buffer copying process (Step A3), when a packet is received from the counter host. The details of the TCP reception protocol process and the parallel buffer copying process will be described later. When the stream data requested by the application section 4 has been prepared by the parallel buffer copying process, the socket processing section 3 notifies a receiving process completion notice to the application section 4, to complete the receiving process (Step A4).

Figure 3:
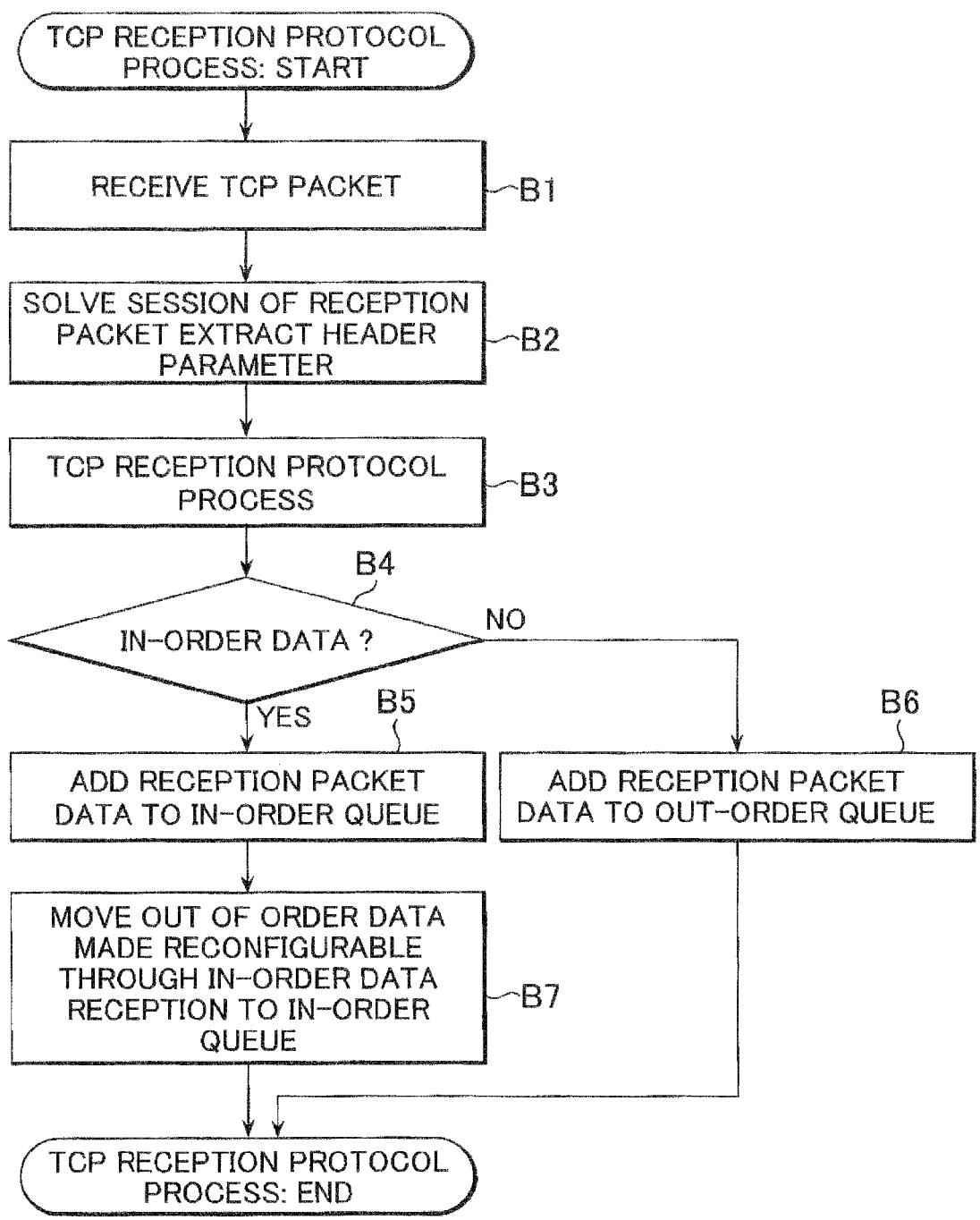
FIG. 3 is a flowchart showing a TCP reception protocol process in the first exemplary embodiment of the present invention.
Figure 4A:
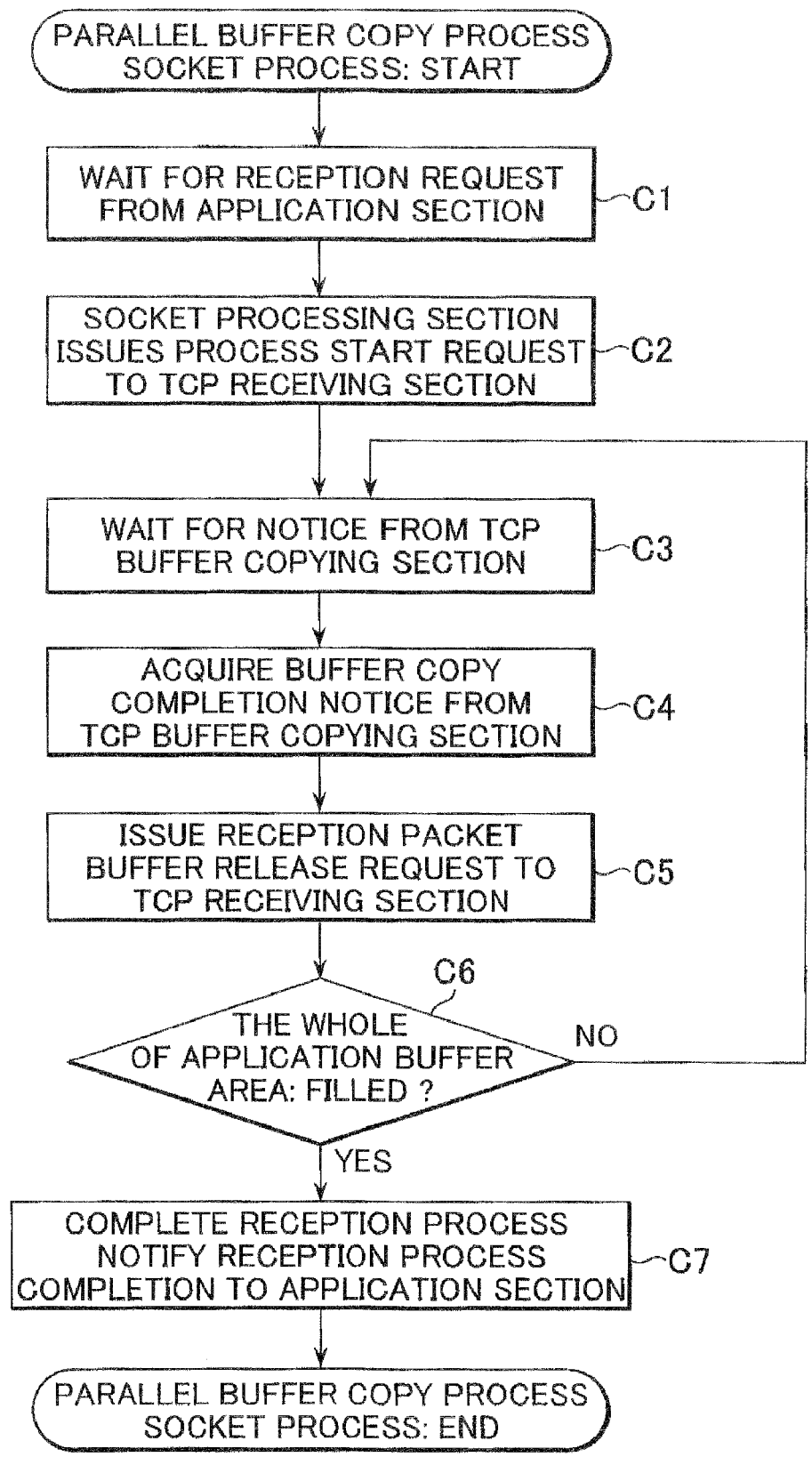
FIGS. 4A to 4D are flowcharts showing a parallel buffer copying process in the first exemplary embodiment of the present invention.
Figure 4B:
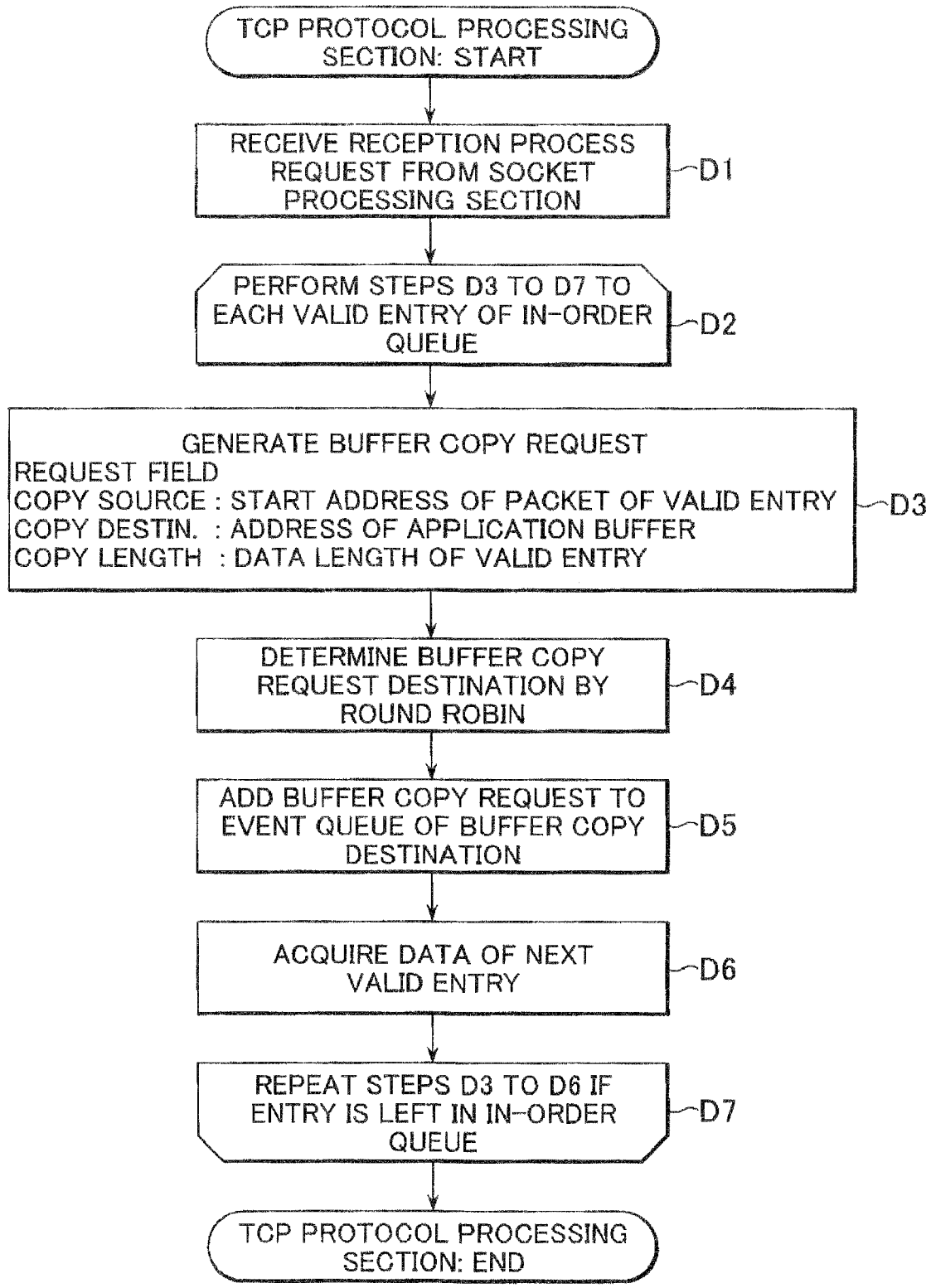
Figure 4C:
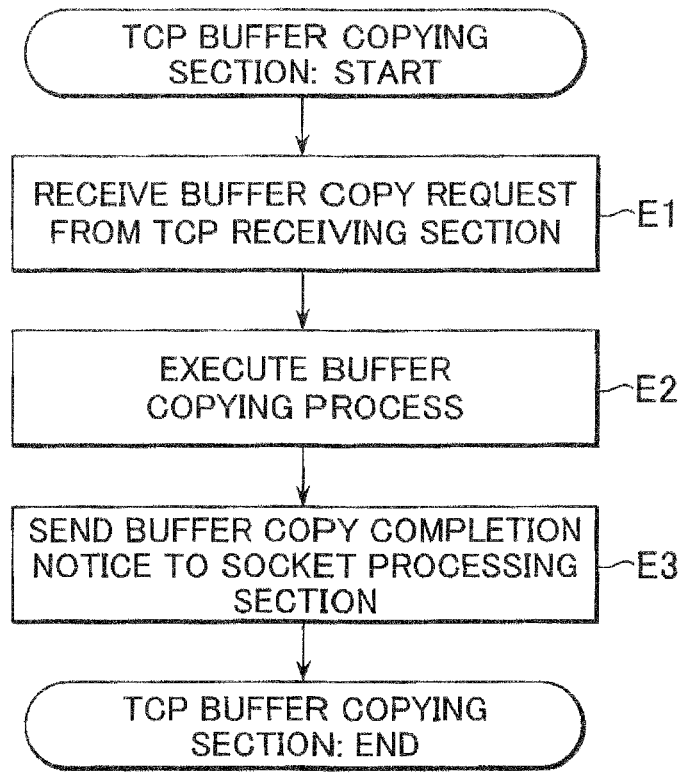
Figure 4D:
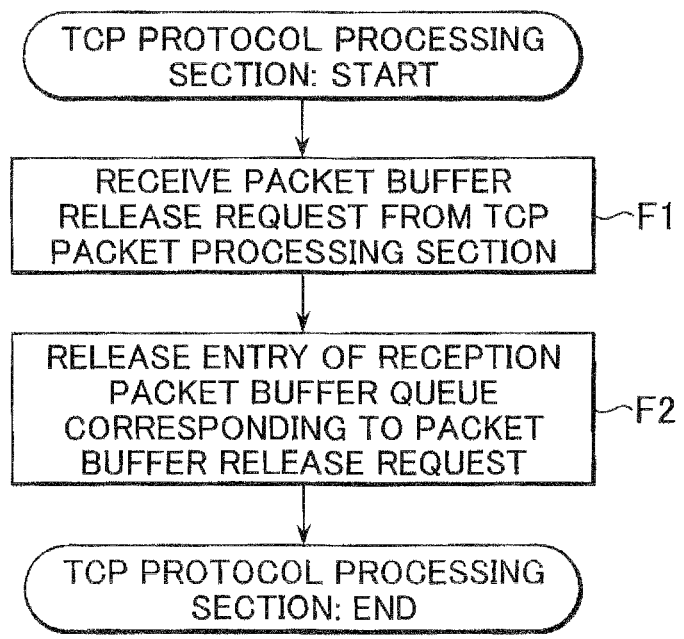

The TCP reception protocol process will be described below in detail with reference to FIGS. 1 and 3. After the reception of the TCP packet from the counter host by the network interface section 11 (Step B1), the packet processing section 12 extracts parameter data of the TCP and IP from the header of the received packet and analyzes a TCP session to which the received packet belongs (Step B2).

In succession, the TCP protocol processing section 13 executes a TCP reception protocol process (Step B3). As an example of the TCP reception protocol process, the update of TCP parameters such as rcv_nxt, the determination of whether the received packet is the in-order data or the out-of-order data from the TCP sequence number, the determination of a valid address and a valid packet length of the packet data indicating a range of the received packet that defines a valid data, in order to re-configure the data stream from the received packets, and the generation of the ACK packet to transmit to the counter host, the sequence number of the data whose reception is completed.

After the reception protocol process, a process for determining whether the received packet is the in-order data or the out-of-order data is executed in accordance with the result of the reception protocol process (Step B4). In case of the in-order data (Yes of Step B4), the received packet data is added to the in-order queue 51 (Step B5). In case of the out-of-order data (No of Step B4), the received packet data is added to the out-of-order queue 52 (Step B6).

Also, there is a case that, when the in-order data is a re-transmitted packet, a lost portion of a data corresponding to the out-of-order data is embedded with the received in-order data, so that there is a case that the out-of-order data can be reconfigured. When such out-of-order data exists, the out-of-order data that is reconfigurable is removed from the out-of-order queue 52 and added to the in-order queue 51 (Step P7).

The parallel buffer copying process will be described below in detail with reference to FIGS. 1 and 4A to 4C. When receiving a process start request from the application section 4, the socket processing section 3 issues a process start notice to the TCP protocol processing section 13. The TCP protocol processing section 13 issues a buffer copying request to each of the TCP buffer copying sections. When receiving the buffer copying requests, each of the TCP buffer copying sections 21 to 2N executes a buffer copying process. The socket processing section 3 checks the buffer copy result and outputs a notice to the application section 4 when the data has been prepared. Also, the TCP protocol, processing section 13 executes a releasing process on a region prior to the buffer copying process.

At first, the socket processing section 3 will be described. The socket processing section 3 waits for the reception of the receiving process request from the TCP receiving section 1 (Step C1). When receiving the receiving process request from the application section 4, the socket processing section 3 issues a process start request to the TCP receiving section 1 (Step C2). The issued receiving process request is stored in the event queue 71. After the process start request is issued, the socket processing section 3 waits reception of a notice from each of the TCP buffer copying section 21 to 2N (Step C3) The requests to the TCP buffer copying section 21 to 2N are stored in the event queue 73. After a buffer copy completion notice is received from the event queue 73 (Step C4), a packet buffer release request is sent to the TCP receiving section 1 in order to release packet data prior to the buffer copying process (Step C5). Also, it is determined whether or not all the regions of the application buffer 6 for the buffer length blen from the start address baddr for the receiving process request from the application section 4 are filled through the buffer copying process (Step C6). If the regions of the application buffer are filled (Yes of Step C6), the receiving process completion notice is outputted to the application section 4 (Step C7). Otherwise (No of Step C6), the process flow returns to the state of waiting for a notice from each of the TCP buffer copying sections 21 to 2N (Step C3). The receiving process completion notice is outputted to the application section 4 by ending a function in case of the recv system call. In case of an asynchronous function, a section for obtaining the process result is provided in the application section 4, and the application section 4 periodically requests the obtaining result, and at the time of the receiving process completion, the fact of the completion is notified in response to the request.

The operation of the TCP protocol processing section 13 in a buffer copy parallel request process will be described below. The TCP protocol processing section 13 refers to an event queue 71 for storing the notices from the socket processing section 3 and receives the receiving process requests from the socket processing section 3 (Step D1). The TCP protocol processing section 13 sequentially executes processes of the valid entries of the in-order queue 51 for storing the packet data that is determined as the in-order data (Steps D2 to D7). In the state in which the buffer copying request is not issued, all the entries of the in-order queue 51 are the valid entries. On the other hand, the entries from which the buffer copying requests are sent to all the data regions among the entries are set to be invalid entries. The invalid entry is removed from the in-order queue when the buffer copy is completed, and the buffer copy completion notice is received from the socket processing section 3. The TCP protocol processing section 13 holds address data of the valid entries.

After acquiring the data of the valid entries of the in-order queue 51, the TCP protocol processing section 13 generates the buffer copying requests (Step D3). A request field at this time is composed of a copy source address, a copy destination address and a copy length. The copy source address is the valid address of the packet data of the valid entry in the in-order queue 51, and the copy destination address is the corresponding address in the application buffer 6. Also, the copy length is a valid length of the packet data of the valid entry in the in-order queue 51.

Here, a specific example of the address of the copy destination is exemplified with reference to FIG. 1. It is supposed that M packets 511 to 51M arrive at the in-order queue 51 as a first data group, after a session start. They are stored in the in-order queue 51 in accordance with the list structure. They are copied in the order starting from the buffer start address baddr, in the application buffer 6. That is, they are copied as follows.

Packet 511→Copy Source: paddr (1),
Copy Destination: baddr (1)=baddr,
Copy Length: plen (1)
Packet 512→Copy Source: paddr (2),
Copy Destination: baddr (2)=baddr (1)+plen (1),
Copy Length: plen (2)
Packet 51N→Copy Source: paddr (M),
Copy Destination: baddr (M)=baddr (M−1)+plen (M−1),
Copy Length: plen (M−1)

The description returns to the buffer copy parallel request process in FIGS. 1 and 4A to 4C. The TCP protocol processing section 13 determines a field of the buffer copying request and generates the buffer copying request and then determines the request destination from the TCP buffer copying sections 21 to 2N (Step D4). The buffer copying request destination is determined in accordance with the round robin. In short, the request destination of the TCP buffer copying section is determined in the order of 21, 22 to 2N. After the requests have been issued to the TCP buffer copying section 2N, the request destination is again selected in the order starting from the TCP buffer copying section 21.

After the determination of the buffer copying request destination, the request is added to the queue corresponding to the request destination among event queues 721 to 72N (Step D5). After the request is added to the event queue, the data of the next valid entries in the in-order queue 51 are obtained (Step D6). If the entry remains in the in-order queue 51, the processes of the steps D3 to D6 are repeated until the buffer copying request is performed on all the regions in the application buffer 6 (Step D7).

The operation of the TCP buffer copying sections 21 to 2N will be described below. The TCP buffer copying sections 21 to 2N monitor the respective corresponding event queues 721 to 72N, and receive the buffer copying requests from the TCP receiving section 1 (Step E1) and then execute the buffer copying process in accordance with a copy source of the buffer copying request, a copy destination and a copy length data (Step E2). After the completion of the buffer copying process, the buffer copy completion notice is notified to the socket processing section 3 (Step E3). The buffer copy completion notice includes the same field as the buffer copying request.

The operation of the TCP protocol processing section 13 in the reception buffer releasing process will be described below. This operation is required in order to release the region of the copy source after the buffer copying process. The TCP protocol processing section 13 monitors the event queue 71, and after receiving a packet buffer release request from the socket processing section 3 (Step E1), releases the packet data of the in-order queue 51 corresponding to the packet buffer release request.

The effect of this exemplary embodiment will be described below. In this exemplary embodiment, after the TCP receiving process, the buffer copying request is distributedly notified to the plurality of TCP buffer copying sections 21 to 2N, thereby executing the buffer copying process in parallel. Consequently, there is a merit that the process time of the TCP buffer copying process whose process load is great can be decreased on the basis of the parallel degree.

Also, the TCP receiving section 1, the TCP buffer copying sections 21 to 2N and the TCP protocol processing section 13 may be designed to asynchronously operate by notifying the process request through the event queue. Consequently, the pipeline execution between the TCP receiving process, the buffer copying process and the socket process can be attained, and the packet process of the higher speed can be executed, as compared with a case that the entire process is executed in one process.

Second Exemplary Embodiment

Figure 6:
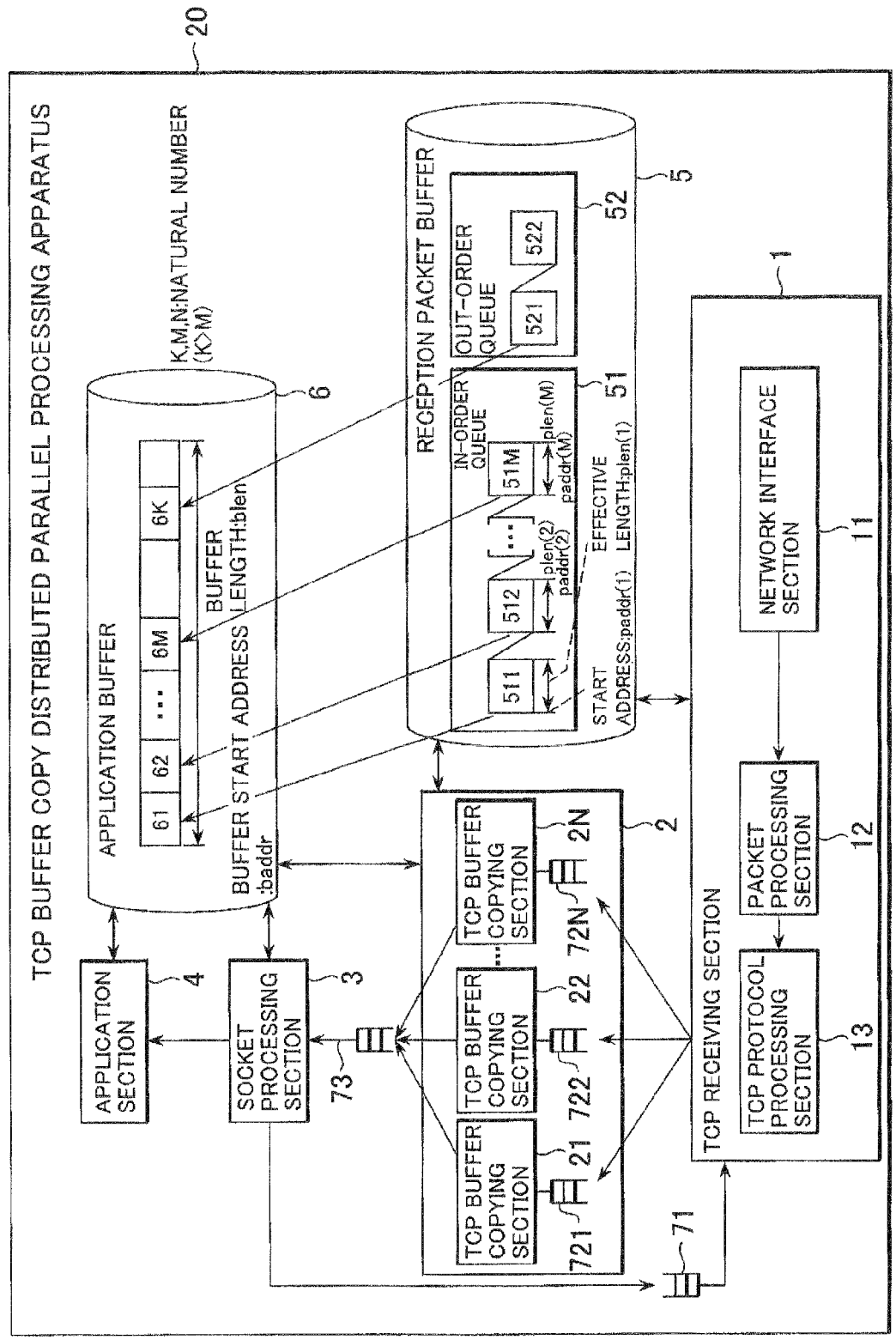
FIG. 6 is a block diagram showing a configuration of a second exemplary embodiment of the present invention.

The second exemplary embodiment of the present invention will be described below in detail with reference to the drawings. FIG. 6 is a block diagram showing the configuration of a TCP buffer copy distributed parallel processing apparatus 20 according to this exemplary embodiment. This exemplary embodiment is intended to protect the performance deterioration, which is caused due to overload in executing the re-configuring process in response to the buffer copying request, by executing the buffer copy without waiting for the state that the out-of-order data is made reconfigurable, when the corresponding copy destination of the out-of-order data is located within a range of the application buffer 6.

With reference to FIG. 6, the in-order queue 51 stores M packets of packets 511 to 51M. At this time, the M packets are copied to the regions 61 to 6M in the application buffer 6 by the first exemplary embodiment. Moreover, the out-of-order queue stores the packet 521. If the copy destination determined from the sequence number of this packet 521 is located within the buffer region determined based on the buffer start address baddr and the buffer length blen of the application buffer 6, the data of the packet 521 is copied to the region 6K (K≧1, K>M) in the application buffer 6.

Figure 7A:
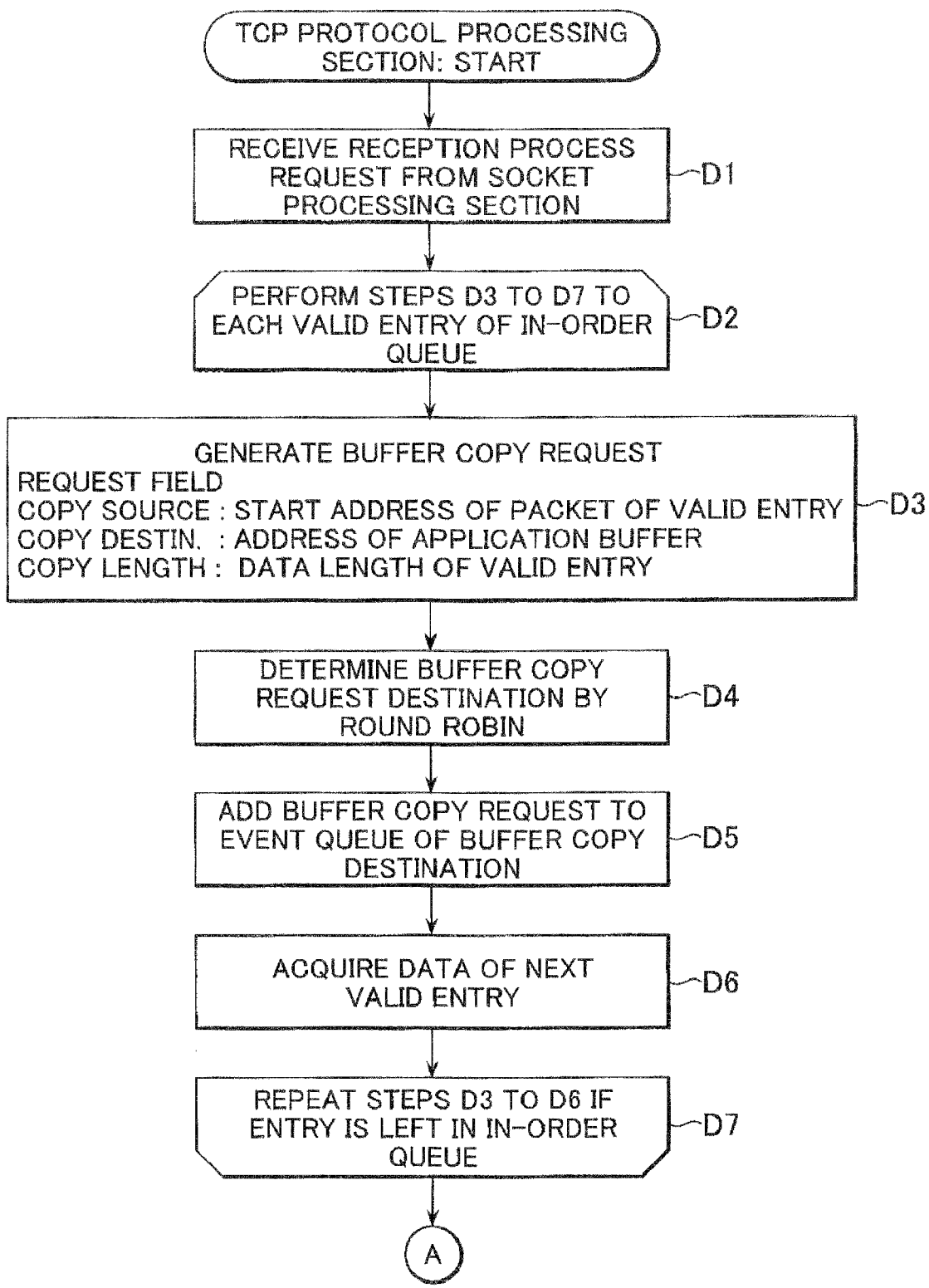
FIGS. 7A and 7B are a flowchart showing a buffer copy parallel request process in the second exemplary embodiment of the present invention.
Figure 7B:
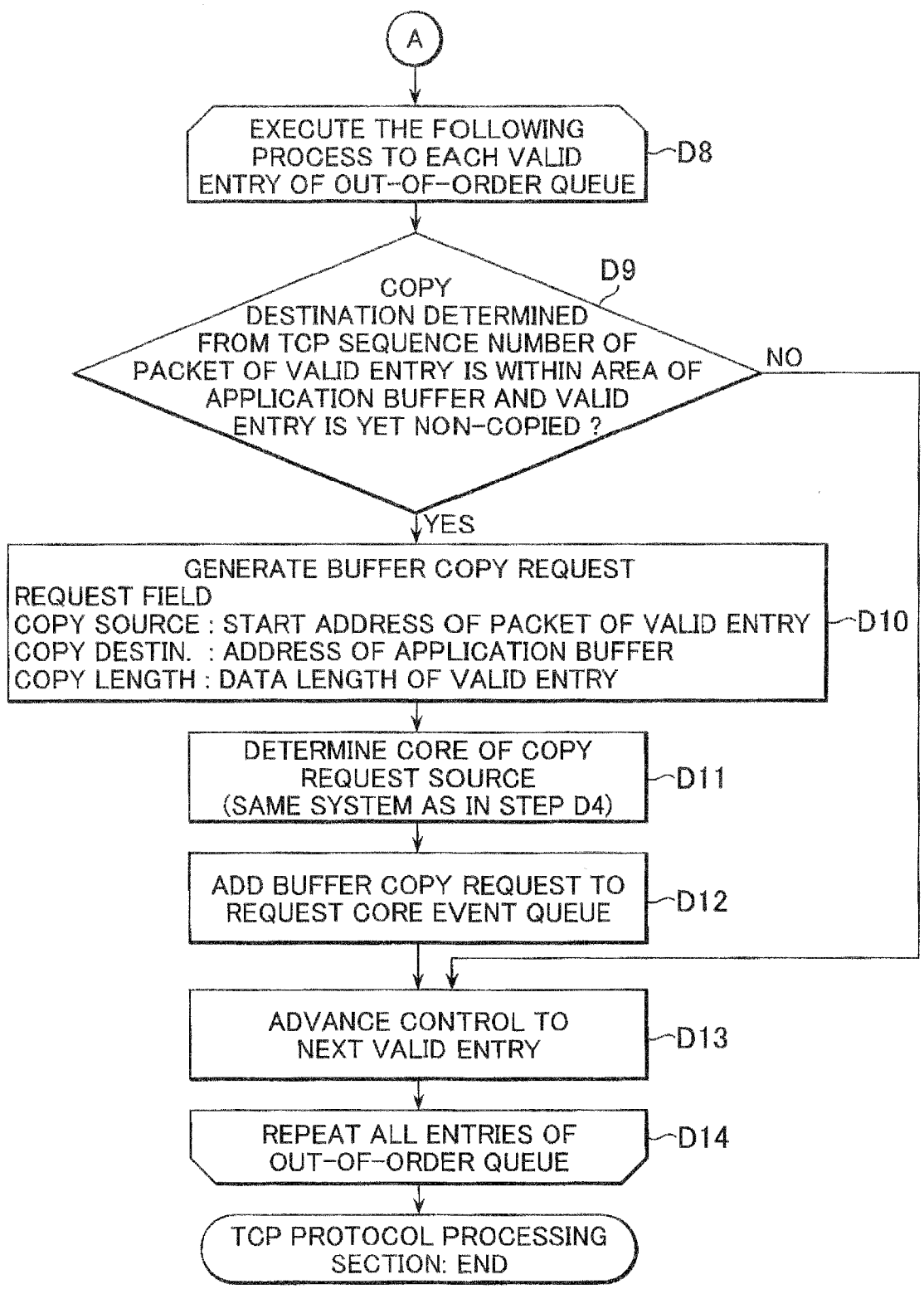

The operation of this exemplary embodiment will be described below in detail with reference to the drawings. FIGS. 7A and 7B show an operation flow in the second exemplary embodiment. In the second exemplary embodiment, a process of steps D8 to D14 is added to the first exemplary embodiment. The process of the steps D1 to D7 in FIGS. 7A and 7B, namely, the process of the TCP protocol processing section 13 in this exemplary embodiment are same as that of the steps D1 to D7 in FIGS. 4A to 4C. Thus, the description of the process is omitted. In the second exemplary embodiment, after the data of all the valid entries in the in-order queue are copied through the process of the steps D1 to D7, the buffer copying request process is also executed on the entries in the out-of-order queue 52. Accordingly, in this exemplary embodiment, the address of the entry on which the buffer copying request process of the out-of-order queue 52 has not been executed is managed as the valid entry of the out-of-order queue.

The TCP protocol processing section 13 obtains the data of the valid entry of the out-of-order queue 52 (Step D8) and determines whether or not a copy destination of the corresponding data in the valid entry is Located within the buffer region of the application buffer 6 (Step D6).

The copy destination of the data is determined from the TCP sequence number of the corresponding packet data in the valid entry. Here, it is supposed that the TCP sequence number of the valid packet data is seq_o and the valid length is len_o. When the TCP sequence number corresponding to the lead of the application buffer 6 is assumed to be seq_b, the lead address of the application buffer 6 is assumed to be baddr, and the buffer length is assumed to be blen, the copy destination address addr is determined from the following relation equation.

$$addr = baddr + seq\_o - seq\_b$$

Also, at this time, the relation equation of (seq_o−seq_b) ≦blen must be satisfied. If this relation equation is not satisfied, the data of the entry is regarded to be outside the range of the application buffer 6.

As the determination result, if the data copy destination is located outside the range of the application buffer 6 (No of Step D9), the process flow proceeds to the next valid entry of the out-of-order queue 52. On the other hand, if it is located within the range (Yes of Step D9), the buffer copying request is issued to the TCP buffer copying section 2 (Step D10). The copy source of this request is a start address of the valid data corresponding to the entry to be processed in the out-of-order queue. On the other hand, the copy destination becomes the address addr of the corresponding region in the application buffer 6, and the copy length becomes the valid data length of the entry to be processed.

After the generation of the buffer copying request, the request destination is determined from among the TCP buffer copying sections 21 to 2N (Step D11). In this exemplary embodiment, for example, similarly to the first exemplary embodiment, the buffer copying request destination may be determined on the basis of the round robin. In short, the TCP buffer copying section of the request destination is selected in an order of 21, 22 to 2N. After the request until 2N, the request destination is again selected in the order starting with 21.

After the determination of the buffer copying request, the request is added to the queue corresponding to the request destination among the event queues 721 to 72N (Step D12). After the request is added to the event queue, the data of the next valid entry in the out-of-order queue 51 is acquired (Step D13). If the entry remains in the out-of-order queue, the process of the steps D9 to D13 are repeatedly executed on the remaining entry (Step D14).

The effect of this exemplary embodiment will be described below. In the conventional TCP process, until the stream can be reconfigurable after the reception of the out-of-order data, the packet data is stored in the reception packet buffer 5. In this case, when the stored out-of-order data can be reconfigurable by re-sending the in-order data, the buffer copying request of the out-of-order data that can be reconfigurable is also issued in addition to the in-order data in the time slot of the packet receiving process corresponding to one packet. Thus, the buffer copying request is overloaded only in the time slot. Accordingly, this exemplary embodiment is designed to carry out the buffer copy in a uniform process time, by sending the buffer copying request without waiting for the state that the out-of-order data is made reconfigurable, if the corresponding copy destination is located within the range of the application buffer 6, after the reception of the out-of-order data. Consequently, when the out-of-order data can be reconfigurable, the load for the buffer copying request is avoided from being concentrated.

Also, in this exemplary embodiment, attention should be paid to the following points. In the process for releasing the reception packet buffer 5 after the buffer copy of the out-of-order data, the packet data itself is allowed to be released through the releasing process. However, a control data including the sequence number of the out-of-order data is required to be held in some style. This is because, if not so, the TCP protocol processing section 13 cannot execute the TCP parameter update (for example, the update of rcv_nxt) in which the out-of-order data range is considered.

Third Exemplary Embodiment

Figure 9:
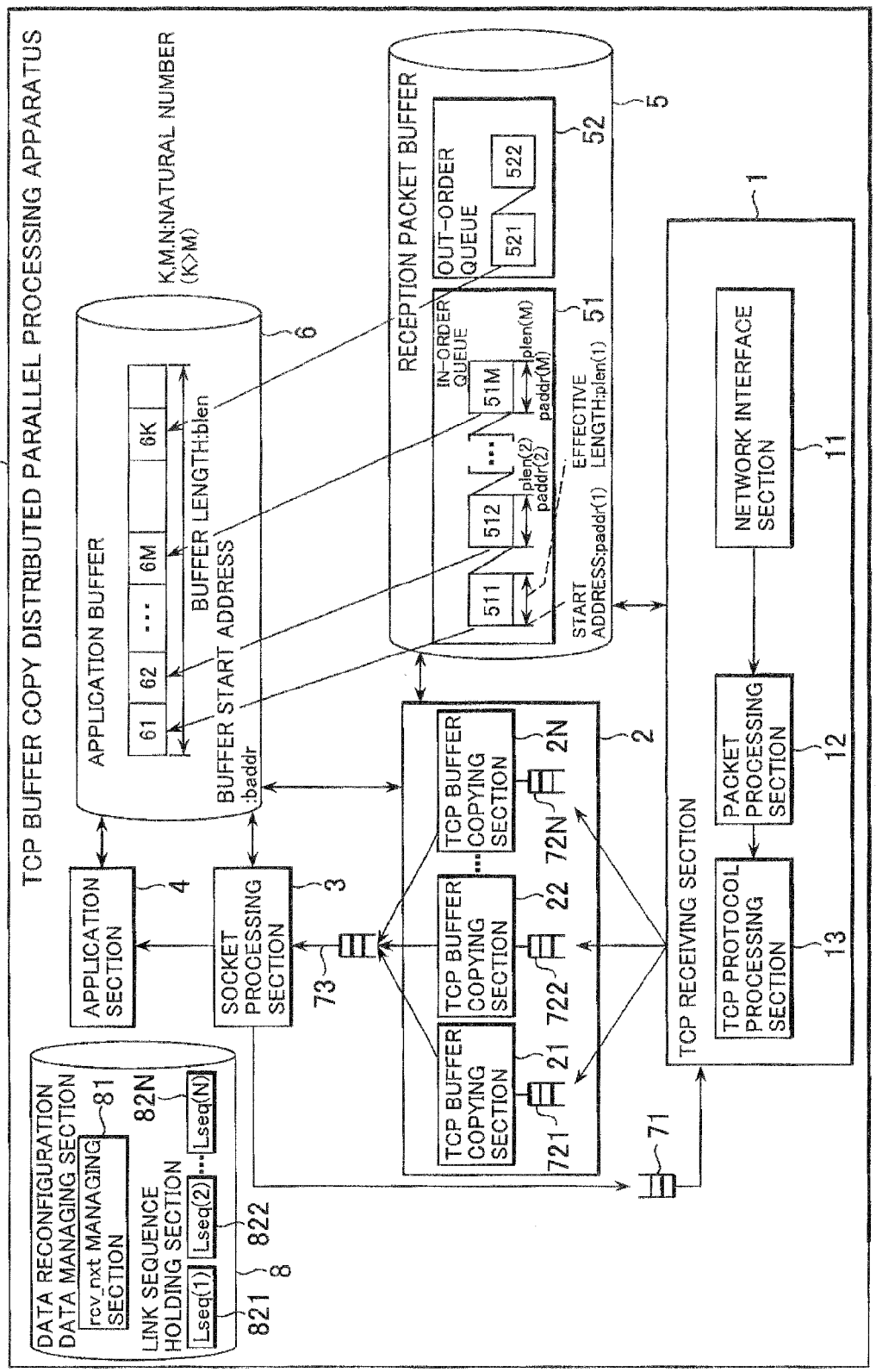
FIG. 9 is a block diagram showing a configuration of a third exemplary embodiment of the present invention.

A third exemplary embodiment will be described below. FIG. 9 is a block diagram showing the configuration of a TCP buffer copy distributed parallel processing apparatus 30 according to this exemplary embodiment. In the second exemplary embodiment, the received out-of-order data is copied to the application buffer 6 without waiting for the state that this is made reconfigurable. However, in this case, it is difficult to determine when the data of the application buffer 6 has been prepared. As described in the first exemplary embodiment, when the data to be copied to the application buffer 6 is insured to be always the in-order data, it is possible to determine whether or not the data has been prepared, only by summing the copy completion data lengths indicated in the buffer copy completion notices. However, under the condition that the out-of-order data is copied in addition to the in-order data, it becomes impossible to determine whether or not the data of the application buffer 6 has been prepared, merely by summing the copied data lengths.

Figure 8A:
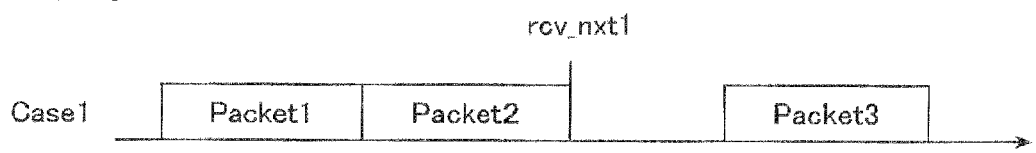
FIGS. 8A and 8B are diagrams showing changes in a data state and a TCP parameter upon arrival of a TCP packet.
Figure 8B:
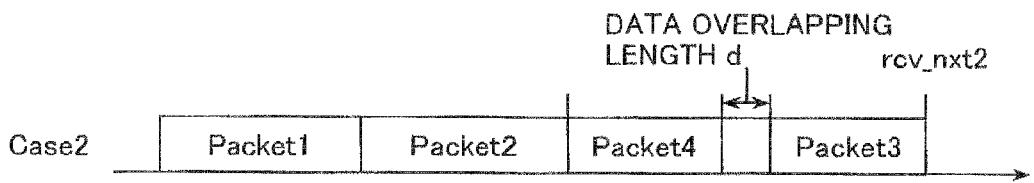

FIGS. 8A and 8B show examples of whether or not the data has been prepared cannot be determined. FIGS. 8A and 8B show a case that the out-of-order data is made reconfigurable as the data. A Case1 in FIG. 8A indicates the state that a packet 1 and a packet 2 of the in-order data and a packet 3 of the out-of-order data arrive. A Case2 in FIG. 8B indicates a state that the packet 3 is made reconfigurable because a packet 4 of the in-order arrives in the data region between the packet 2 and the packet 3. However, in the Case2, the overlapping occurs between the packet 3 and the packet 4. In this case, in the TCP, a priority is given to the data continuing from the previous sequence. Thus, the data of the packet 3 is overwritten onto the packet 4 by a data overlapping length d. At this time, the mismatching is generated in the total of the copy completion data lengths and the total of the data lengths prepared in the application buffer 6, correspondingly to the overlapping length d. Thus, when the socket processing section 3 sums the copy completion data lengths indicated in the buffer copy completion notices and consequently determines whether or not the data has been prepared, it is impossible to detect the fact that the application data has been prepared.

The third exemplary embodiment is typically employed in the foregoing system. Instead of the method that determines whether or not the application data are prepared by summing the copy completion data lengths noted in the buffer copy completion notices, this is designed be able to accurately determine whether or not the application data are prepared, even if the overlapping of the out-of-order data is generated, because the value of the TCP parameter rcv_nxt managed in the TCP protocol processing section 13 is included in the buffer copy completion notice.

FIGS. 8A and 8B show the TCP parameter rcv_nxt managed in the TCP protocol processing section 13. The TCP parameter rcv_nxt is a parameter defined by RFC793 (Jon Postel, "Transmission Control Protocol", RFC793 http://www.faqs.org/rfcs/rfc793.html]) and indicates the sequence number of the tail data of the reception data that is made reconfigurable.

With reference to FIGS. 8A and 8B, in case of the Case1, a portion up to the packet 2 is made reconfigurable at the time of the arrival of the packet 3. Thus, the value of the rcv_nxt indicates the tail portion of the packet 2 (rcv_nxt1). On the other hand, in case of the Case2, the packet 3 is made reconfigurable at the time of the arrival of the portion up to the packet 4. Therefore, the value of the rcv_nxt indicates the tail portion of the packet 3 of the out-of-order data (rcv_nxt3).

The configuration of the third exemplary embodiment will be described below in detail with reference to the drawings. With reference to FIG. 9, the TCP buffer copy distributed parallel processing apparatus 30 according to the third exemplary embodiment of the present invention contains a data re-configuration data managing section 8.

The data reconfiguration data managing section 8 includes: holding sections 821 to 82N for holding N link sequence numbers contained in the buffer copy completion notices sent from the TCP buffer copying sections 21 to 2N; and an rcv_nxt managing section 81 for managing the rcv_nxt data of the TCP parameter. The link sequence number is a number to manage the cycle number of the distributed assignments of the buffer copying requests to the TCP buffer copying sections 21 to 2N. Each time the TCP receiving section 1 transmits the buffer copying request to all the TCP buffer copying sections 21 to 2N, the link sequence number is increased by "1".

Figure 10A:
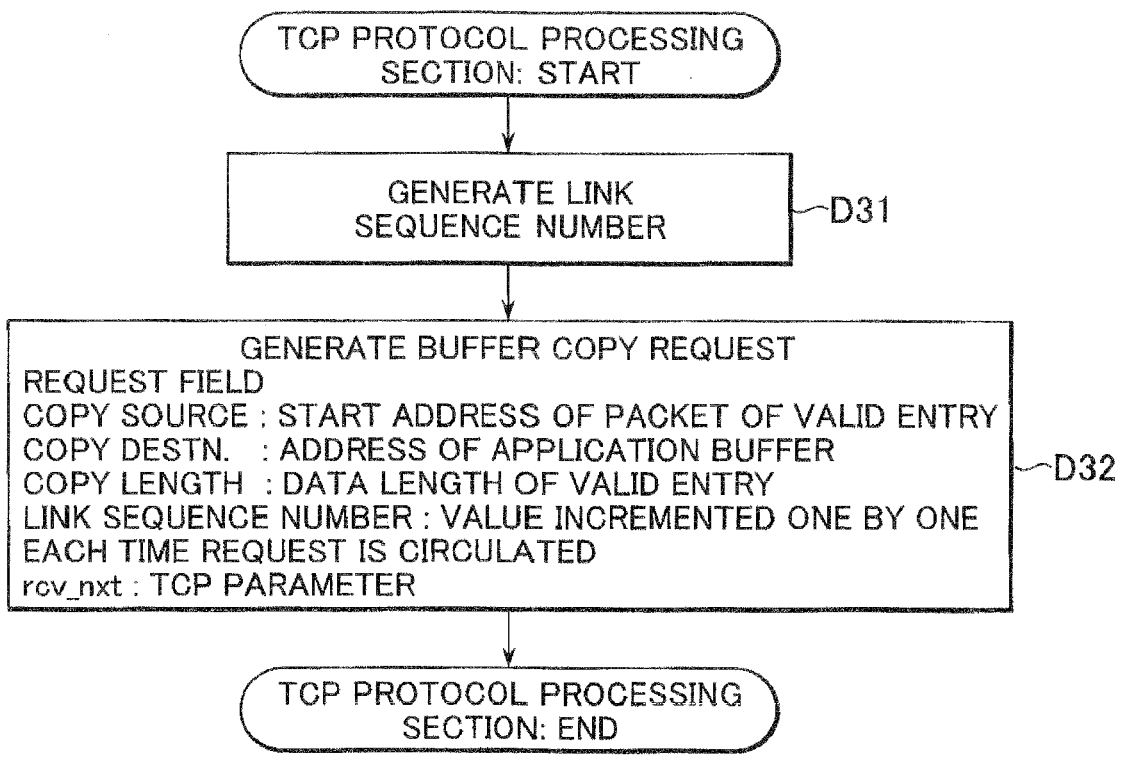
FIGS. 10A and 10B are flowcharts showing a buffer copying request generating process in the third exemplary embodiment of the present invention.
Figure 10B:
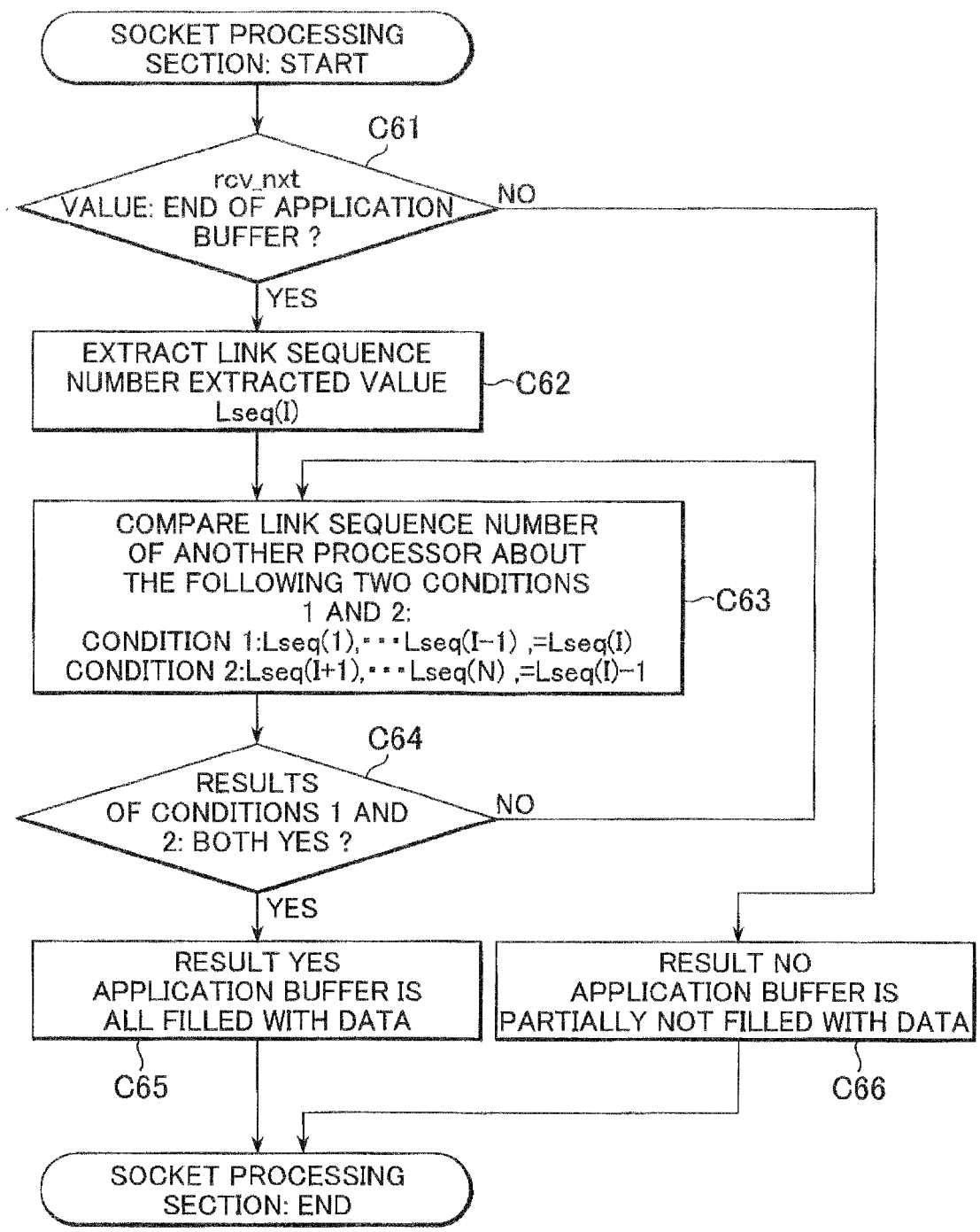

The operation of the third exemplary embodiment will be described below. With reference to FIGS. 10A and 10B, the operation of the third exemplary embodiment is divided into a buffer copying request generating process of the TCP protocol processing section 13; and a completion determining process for determining whether or not the data is copied to all the regions in the application buffer 6 in the socket processing section 3.

The operation of the buffer copying request generating process of the TCP protocol processing section 13 will be described below. The buffer copying request generating process corresponds to the step D3 (FIGS. 4A to 4C and 7A and 7B) in the first and second exemplary embodiments. In this exemplary embodiment, in addition to the operations of the first and second exemplary embodiments, the link sequence number is determined (Step D31) when the buffer copying request is generated. For each cycle of the buffer copying request to the TCP buffer copying sections 21 to 2N from the TCP receiving section 1, "1" is added to the link sequence number. After the generation of the link sequence number, the buffer copying request is issued (Step D32). The request field includes the link sequence number and the rcv_nxt of the TCP parameter, in addition to the field of the first and second exemplary embodiments.

The process prior to the generation of the buffer copying request and the operation of the TCP protocol processing section 13 after the request generation are the same as those shown in FIGS. 4A to 4C and 7A and 7B. Thus, their descriptions are Also, the TCP buffer copying sections 21 to 2N add the link sequence number and the rcv_nxt parameter, which are indicated in the buffer copying request, to the buffer copy completion notice and transfers to the socket processing section 3.

The method of determining the completion of the copying process to all the regions in the application buffer 6 will be described below. If a value of the rcv_nxt of the buffer copy completion notice transferred to the socket processing section 3 does not arrive at the tail of the application buffer 6 (No of Step C61), the buffer copying request to all the regions in the application buffer 6 are determined not to be notified (Step C66). On the other hand, if it arrives at the tail thereof (Yes of Step C61) the buffer copying request to all the regions in the application buffer 6 is determined to be notified, and its link sequence number is extracted (Step C62). The extracted link sequence number is assumed to be Lseq(I). After the extraction of the link sequence number, whether or not the copying processes of the TCP buffer copying sections 21 to 2N have been completed is determined by comparing the value of the link sequence number with the following two conditions (Step C63):

Condition 1: the value of Lseq(1), . . . , Lseq(I−1) is equal to Lseq(I); and

Condition 2: the value of Lseq(I+1), . . . , Lseq(N) is equal to Lseq(I)−1.

If both of the two conditions are satisfied (Yes of Step C64), the copying process to all the regions in the application buffer 6 is determined to be completed (Step C65). On the other hand, otherwise (No of Step C64), there is a region in which the buffer copy is not completed. Thus, the operation flow waits for the arrival of the notice of the non-completed region.

With the foregoing operation, it is possible to determine whether or not the copy to all the regions in the application buffer 6 has been completed. Also, according to this exemplary embodiment, the determination of the completion can be accurately performed, even if the in-order data after the arrival of the out-of-order data overlaps with the out-of-order data.

Fourth Exemplary Embodiment

The fourth exemplary embodiment will be described below. In the third exemplary embodiment, since the method of distributedly assigning the TCP buffer copy is based on a round robin method, it is possible to know in advance an expectation value of the link sequence number corresponding to each of the TCP buffer copying sections 21 to 2N in order to carry out the completion determination. However, when the method of distributedly assigning the buffer copy is arbitrary instead of the round robin method, or when the buffer copy request for the region of the tail of the application buffer 6 is performed on the block in the course of the cycle of the distributed assignment, it is impossible to know the expectation value of the link sequence number corresponding to each TCP buffer copying section at the time of the completion determination, in the conventional method.

Therefore, in this exemplary embodiment, after transmitting the data corresponding to the tail of the application buffer 6, the TCP protocol processing section 13 transmits a dummy request to the distributed assignment destination on which the distributed assignment is not still, performed. Consequently, at the time of the completion determination, the expectation values of the link sequence numbers corresponding to all the TCP buffer copying sections are insured to be equal. Thus, the socket processing section 3 can determine whether or not the copying process has been completed, independently of the distributedly assigning method, only by determining that the link sequence numbers corresponding to all the distributedly assignment destinations coincide with the link sequence number of the final cycle.

Since the configuration of the fourth exemplary embodiment is the same as the configuration (FIG. 9) of the third exemplary embodiment, its description is omitted.

Figure 11A:
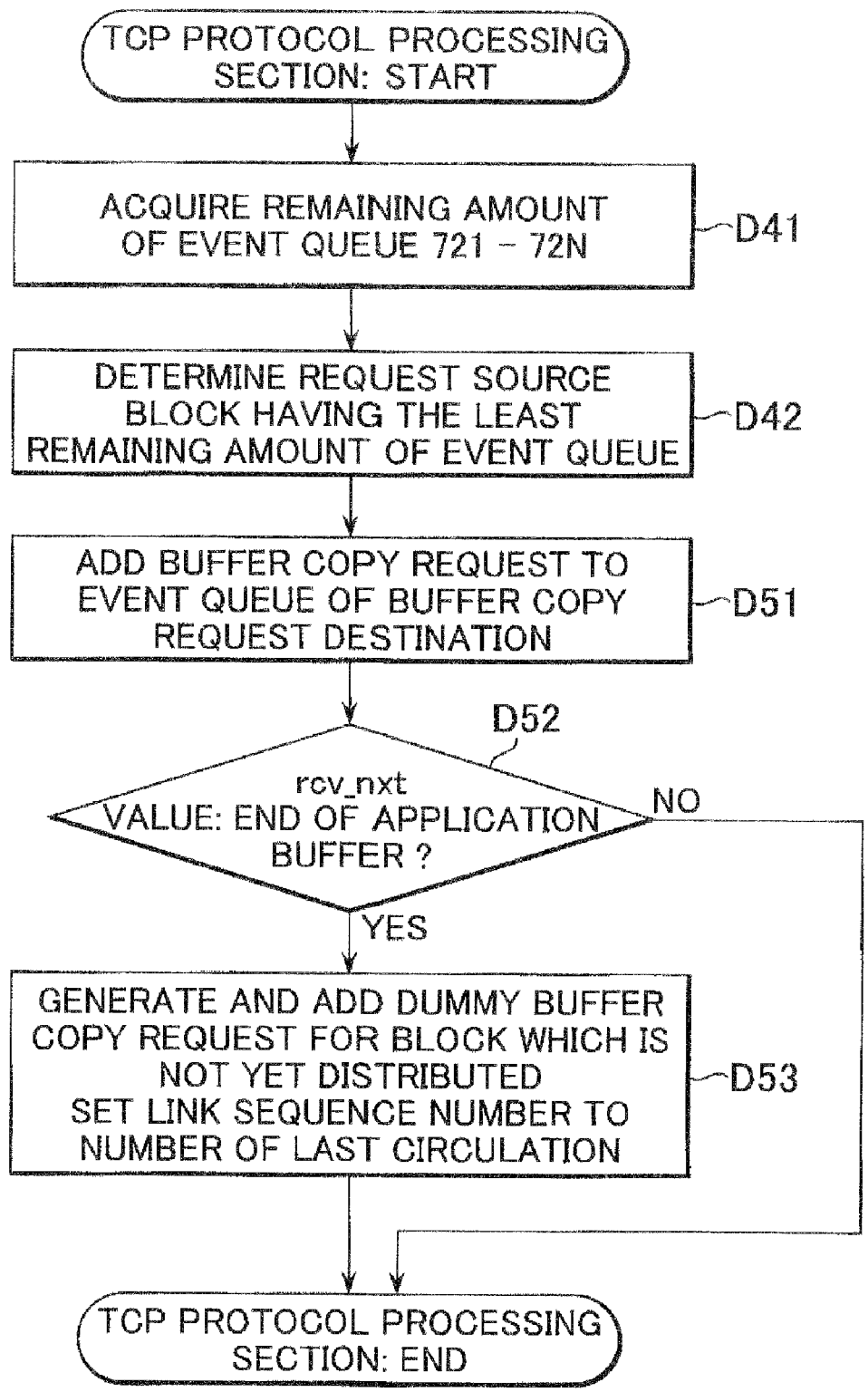
FIGS. 11A and 11B are flowcharts showing an Event queue process in a fourth exemplary embodiment of the present invention.
Figure 11B:
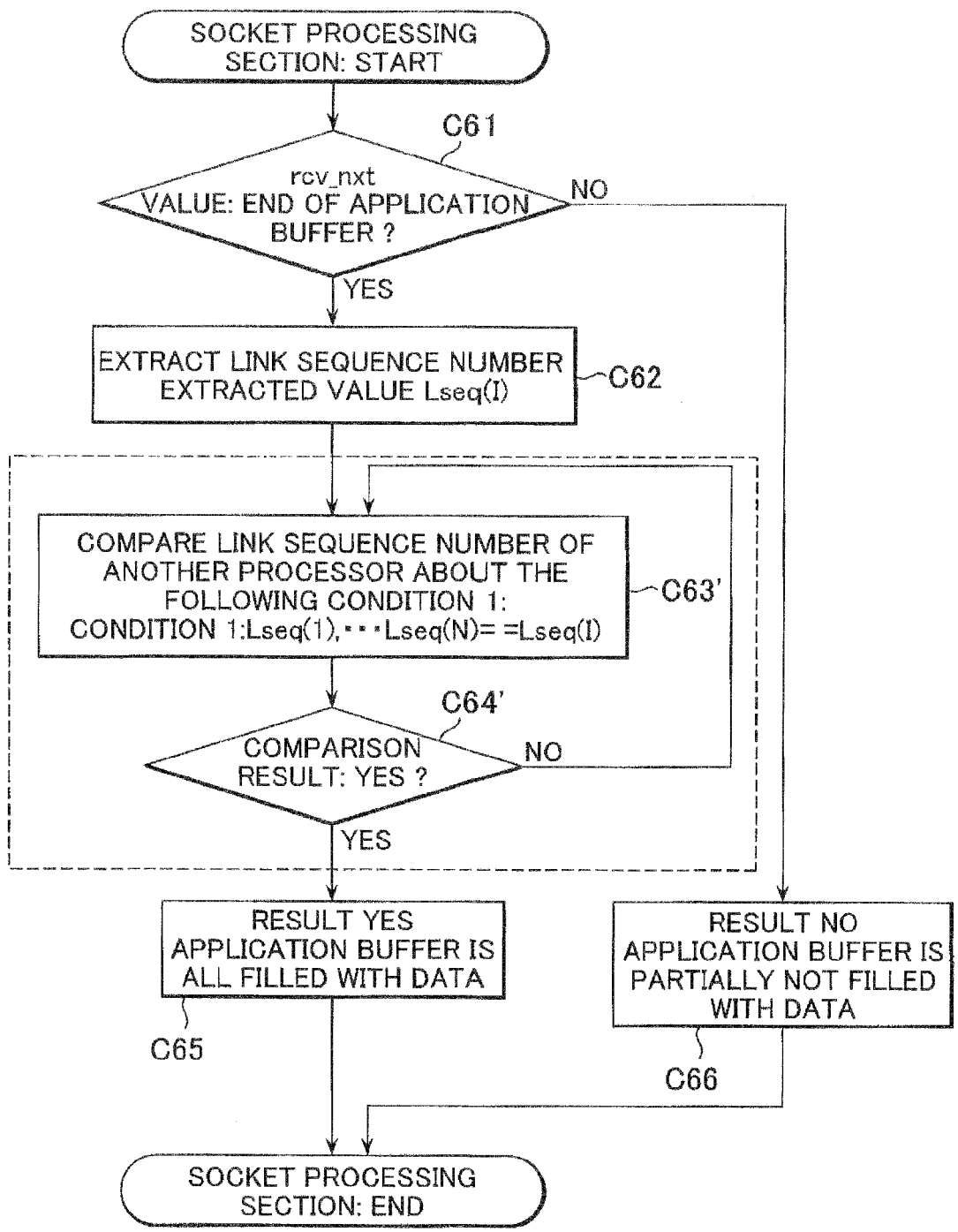

The operation of the fourth exemplary embodiment will be described below. The operation of the TCP protocol processing section 13 in the fourth exemplary embodiment differ from that of the TCP protocol processing section 13 in the third exemplary embodiment in the step for determining the buffer copy request destination (Step D4) and the step for adding the buffer copy request to the event queue of the buffer copy request destination (Step D5). FIGS. 11A and 11B show the content changed at these steps D4 and D5. Unlike the determination based on the round robin method in the third exemplary embodiment, when the buffer copy request destination is determined, the remaining amounts of the event queues 721 to 72N are obtained (Step D41), and the TCP buffer copying section corresponding to the event queue having the smallest remaining amount is determined as the distributed assignment destination (Step D42). The buffer copy request is added to the event queue corresponding to the distributed assignment destination (Step D51). Here, in accordance with the remaining amount of the event queue, a block having the least load is determined as the distributed assignment destination. However, a different method may be used. In such a case, when the different method is used, there is a constraint that it must not be distributedly assigned to the same block a plurality of times, in the cycle of the distributed assignment. Therefore, the distributed assignment destination on which the distributed assignment is performed one time cannot be set as the distributed assignment destination, until the request is issued to all the other distributed assignment destinations.

Next, the TCP protocol processing section 13 determines whether or not the value of the rcv_nxt corresponding to the packet on which the buffer copy request is performed corresponds to the tail of the application buffer 6 (Step D52). In case that the value corresponds to the tail (Yes of Step D52), after notifying the buffer copy request, the dummy buffer copy request is generated for all the distributed assignment destinations on which the distributed assignment is not still performed, and this is added to the corresponding event queue. This dummy buffer copy request is a request that does not execute the copying process, and it is executed in order to notify the same link sequence number to all the distributed assignment destinations. The above-mentioned explanation implies the operation of the TCP protocol processing section 13 in this exemplary embodiment.

Next, the step for determining whether or not the application buffer 6 has been fully filled by the socket processing section 3 will be described. The configuration different from the third exemplary embodiment lies in steps C63' and C64' surrounded by a dotted line. Unlike the third exemplary embodiment, the buffer copy request including the dummy request is notified to all the distributed assignment destinations in the fourth exemplary embodiment. Thus, it is adequate that the socket processing section 3 determines whether or not all the link sequence numbers corresponding to the N TCP buffer copying sections are coincident with each other, as the determination condition of the buffer copying process complementation for all the regions (Step C63'). If the determination result is true (Yes of Step C64'), all the data in the application buffer 6 are determined to be set (Step C65). On the other hand, otherwise (No of Step C641), it is determined that there is a block in which the process is not still completed, and the operation flow waits for the arrival of the notice of the remaining block.

According to this exemplary embodiment, even the distributedly assigning method other than the round robin method can determine whether or not the application buffer 6 is filled.

Example 1

Next, the operation of the first exemplary embodiment of the present invention will be described by using a specific example with reference to FIG. 1. It is supposed that the M packets sent from the counter host arrive at the TCP receiving section 1 without any order change or any discard on the communication route. At that time, the packet data is written into the reception packet buffer 5 by the network interface section 11. Also, the packet data is checked for the checksum by the packet processing section 12, and the fact that the M packets have the same session is recognized through a session retrieval. Moreover, the M packets are recognized as the in-order data by the TCP protocol processing section 13, and added to the in-order queue 51. Then, as the result processed by the TCP protocol processing section 13, the copy destinations of the M packets 511 to 51M are determined to be 61 to 6M. Then, in the buffer copying process, the buffer copy destination is distributedly assigned on the basis of the round robin method so that the first packet is assigned to the TCP buffer copying section 21, the second packet is assigned to the TCP buffer copying section 22, and the $M^{th}$ packet is assigned to the TCP buffer copying section 2M (however, in case of M>N).

Consequently, the M packets 511 to 51M stored in the in-order queue 51 are copied in parallel to the regions 61 to 61M of the application buffer 6, respectively.

Conventionally, after waiting for the fact that the packet data of the first packet 511 is copied to the region 61, the process of copying the packet 512 is started. However, in this exemplary embodiment, since the process of copying the packet 512 is started without waiting for the completion of the copy of the packet 511, the process time except the memory access that is necessary for the buffer copy can be reduced, thereby reducing the total process time.

Example 2

The operation of the second exemplary embodiment will be described below on the basis of a specific example with reference to FIG. 6. It is supposed that the M packets sent from the counter host arrive at the TCP receiving section 1 without any order change or any discard on the communication route, and then two packets whose data sequence numbers are lost on the communication route arrive. At that time, the (M+2) packets are processed by the TCP protocol processing section 13. The M packets are recognized as the in-order data and added as the packets 511 to 51M to the in-order data. Then, the succeeding two packets are recognized as the out-of-order data and added as packets 521 and 522 to the out-of-order queue 52.

In the first exemplary embodiment, the packet data 521 and 522 stored in the out-of-order queue 52 are not buffer-copied until the arrival of the in-order data to be filled between the packet data stored in the in-order queue and the out-of-order data, and they are held in the out-of-order queue 52. At the time of the arrival of the in-order data to be filled between them, the packets 521 and 522 are added from the out-of-order queue 52 to the in-order queue 51, and the copying process is executed by the TCP buffer copying sections 21 to 2N.

On the other hand, in the second exemplary embodiment, when the data sequence number of the out-of-order data packet 521 is located within a copy range of the application buffer 6, the out-of-order packet 521 is buffer-copied to the region 6K of the application buffer 6 from the out-of-order queue 521 by the TCP buffer copying sections 21 to 2N, without waiting for the state that the TCP segment is made reconfigurable by the in-order queue 51.

These buffer copying processes are executed in parallel, because the buffer copy request is distributedly assigned to the plurality of TCP buffer copying sections 21 to 2N, similarly to the first exemplary embodiment. Thus, the M packets 511 to 51M stored in the in-order queue 51 and the packet 521 stored in the out-of-order queue are copied in parallel to the regions 61 to 6M and 6K (M<K) of the application buffer 6, respectively.

Conventionally, when the out-of-order data is made reconfigurable as the stream with the in-order data, the process of copying the out-of-order data together with the in-order data is required in the time slot of one packet process time. Thus, there is a problem that, since the buffer copy requests are concentrated on a particular time, the performance is reduced. However, in this exemplary embodiment, when the out-of-order data can be copied, this is copied to the application buffer 6. Thus, the buffer copy requests can be uniformed, thereby avoiding the drop in the performance.

Example 3

The operation of the third exemplary embodiment of the present invention will be described below by using a specific example with reference to FIG. 9. When sending the buffer copy request, the TCP protocol processing section 13 determines the distributed assignment destination on the basis of the round robin method. At that time, in the first cycle of the round robin distributed assignment, the same link sequence numbers such as 1, 1, 1, ... are distributedly assigned to the TCP buffer copying sections 21 to 2N, and in the second cycle, the link sequence numbers such as 2, 2, 2, ... are distributedly assigned to the TCP buffer copying sections 21 to 2N. Also, the value of the TCP parameter rcv_nxt after the corresponding packet process together with the link sequence number is given.

The TCP buffer copying sections 21 to 2N send the buffer copy completion notices with the link sequence number and the value of the rcv_nxt written, to the socket processing section 3 after the execution of the buffer copying processes, similarly to the first and second exemplary embodiments.

The socket processing section 3 refers to the value of the rcv_nxt noted in the buffer copy completion notice and determines whether or not the value of the rcv_nxt for the corresponding region is the tail of the application buffer 6. If the value of the rcv_nxt is the tail, the determination based on the following two conditions is performed on the link sequence number Lseq(I) written in the completion notice:

Condition 1: Lseq(1), Lseq(I−1)==Lseq(I)

Condition 2: Lseq(I+1), ..., Lseq(N)==Lseq(I)−1

Here, let us consider the specific example Let us suppose that a parallel degree N=5, and when it corresponds to the tail of the application buffer 6, a block number I=3, and Lseq(I)=10. At this time, when all the previously-notified buffer copying processes are assumed to be already completed, the block numbers 1, 2 and 3 are expected to be the final cycle of the round robin, and the block numbers 4, 5 are expected to be the cycle one cycle earlier. Thus, in accordance with the following two conditions, whether or not the previously-notified buffer copying process is already completed is determined.

Condition 1: Lseq(1)=Lseq(2)=Lseq(3)=10

Condition 2: Lseq(4)=Lseq(5)=9

If these conditions are satisfied, the whole of the application buffer 6 is determined to have been filled. If they are not satisfied, the previously-requested buffer copying process is not still completed. Thus, the operation flow waits for the completion.

Conventionally, whether or not the application buffer 6 has been filled is determined by summing the data lengths in which the buffer copying processes are completed. However, in this exemplary embodiment, since the determination is carried out by referring to the rcv_nxt, the fact that the application buffer 6 has been filled can be correctly determined even if the overlapping of the out-of-order packets is caused which cannot be determined in the conventional technique.

Example 4

The operation of a fourth example in the present invention will be described below. In the third example, the distributed assignment destination of the buffer copying process is determined on the basis of the round robin method. In this example, by referring to the depths of the event queues 721 to 72N of the distributed assignment destination, the queue having the least entry is dynamically determined as the distributed assignment destination. Also, in this example, it is required to be always distributedly assigned to all the blocks for each cycle. Also, it is not admitted to distributedly assign to the same block plural times in the same cycle. After the determination of the distributed assignment destination, the buffer copy request is issued. When this buffer copy request is that of the data corresponding to the tail of the application buffer 6, the dummy buffer copy request is issued to all the blocks on which the distributed assignment is not still performed at that cycle. This request is a request in which the buffer copying process is not executed, and this is executed in order to send the same link sequence number to all the blocks.

Also, the completion of the buffer copying process to the application buffer 6 is determined as follows. That is, when the parallel degree N=5, and the block number I=3 in case of corresponding to the tail of the application buffer 6, and Lseq(I)=10, this is determined in accordance with the following condition:

Condition: Lseq(1)=Lseq(2)= ... =Lseq(5)=10

If this condition is satisfied, the whole of the application buffer 6 is determined to have been filled. If this condition is not satisfied, the previously-requested buffer copying process is not still completed. Then, the operation flow waits for the completion.

According to the present invention, as described above, in a TCP buffer copy distributed parallel processing apparatus, in a copy request of a valid data of a packet determined to be in-order to an application buffer after a TCP protocol process, a destination of a buffer copy request is selected by a round robin method from a plurality of TCP buffer copying sections so as for the buffer copy request to be transmitted Consequently, the buffer copy of the packet data to the application buffer after the TCP protocol process is subjected to distributed parallel processing, to improve the performance.

Also, the TCP buffer copy distributed parallel processing apparatus in of the present invention, after the TCP protocol process, when the copy destination of the valid data of the packet determined as an out-of-order exists within the buffer region of the application buffer, the buffer copy of out-of-order data is executed without waiting for a state that the out-of-order data is made reconfigurable. Consequently, the copying process is uniformed, and the process time is decreased.

Moreover, in the TCP buffer copy distributed parallel processing apparatus of the present invention, in order to detect that the data of the application buffer is prepared, a TCP parameter rcv_nxt managed by a TCP protocol processing section and a link sequence number to manage the number of times of the buffer copy request are added to a buffer copy completion notice through the TCP buffer copying section. Consequently, the fact that the data of the application buffer is prepared is correctly detected even under a state that the overlapping of the out-of-order data is generated.

Also, in the TCP buffer copy distributed parallel processing apparatus of the present invention, after the TCP protocol processing section transmits the buffer copy request of the data corresponding to the final region in the application buffer, the dummy buffer copy request is notified to all blocks to which the buffer copy request is not still sent at the cycle of the distributed assignment. Consequently, the completion of the buffer copying processes in all the blocks can be detected even in case that the distributed destination of the buffer copy is dynamically selected.

According to the present invention, as described above, whether or not all the buffer copying processes are completed can be determined, even in the method in which the distributedly assigning method is not based on the round robin method. Thus, the method whose distributedly assigning method is not static, even the method of dynamically distributedly assigning to the block in which the depth of the event queue is shallow and the load is small can attain the buffer copying processes in parallel.

While the present invention has been particularly shown and described with reference to the exemplary embodiments thereof, the present invention is not limited to these exemplary embodiments. It will be understood by those of ordinary skill in the art that various changes in form and details may be made therein without departing from the spirit and scope of the present invention as defined by the claims.

What is claimed is:

1. A TCP buffer copy distributed parallel processing apparatus, comprising:
   a TCP reception processing section;
   one or more TCP buffer copying sections;
   a socket processing section;
   a reception packet buffer; and
   an application buffer,
   wherein said reception packet buffer and said application buffer are storage regions accessible from said TCP reception processing section, said TCP buffer copying sections and said socket processing section,
   said TCP reception processing section executes a packet receiving process and a TCP protocol process,
   when it is determined to be in-order in which packets are received in the same order as a transmission order from a counter host, the received packets are stored in an in-order queue provided in said reception packet buffer,
   copy destination regions in said application buffer are determined based on TCP sequence numbers of the received packets,
   a buffer copy request is issued to copy the received packets from said reception packet buffer into said application buffer,
   any of said TCP buffer copying sections is selected to send the buffer copy request to the selected TCP buffer copying section, such that buffer copy of the received packets is executed as a distributed parallel process, and
   when it is determined to be out-of-order in which the packets are received in an order different from the transmission order from the counter host, the received packets are stored in an out-of-order queue provided in said reception packet buffer.

2. The TCP buffer copy distributed parallel processing apparatus according to claim 1, wherein said TCP reception processing section generates the buffer copy request, only when copy destinations of the received packets which are determined to be out-of-order are included within the copy destination regions of said application buffer, and
   any of said TCP buffer copying section is selected to notify the buffer copy request to said selected TCP buffer copying section such that the received packets are subjected to the distributed parallel process.

3. The TCP buffer copy distributed parallel processing apparatus according to claim 1, wherein each of said TCP reception processing section, said TCP buffer copying sections and said socket processing section are provided with an event queue,
   the buffer copy request is notified by adding the buffer copy request in said event queue of a request receiving side,
   said request receiving side carries out polling of said own event queue, and performs buffer copy request when the buffer copy request is added to said own event queue, and
   said TCP reception processing section, said TCP buffer copying sections and said socket processing section perform asynchronous operations, respectively.

4. The TCP buffer copy distributed parallel processing apparatus according to claim 3, wherein said TCP protocol processing section refers to a residual amount of said event queue provided for said TCP buffer copying section and dynamically selects one of said TCP buffer copying sections which has the least residual amount of said event queue, as a notification destination of the buffer copy request.

5. The TCP buffer copy distributed parallel processing apparatus according to claim 4, wherein when the buffer copying process is completed, said TCP buffer copying section notifies to said socket processing section, the buffer copy completion notice which contains the data length of the copied data,
   said application buffer has a buffer region for a length blen from an address baddr as a copy destination region, and
   said socket processing section sums the data lengths of the copied data which are contained in the buffer copy completion notices, and determines whether or not the buffer copy request is notified to all the regions in said application buffer based on whether or not the summed result reaches to a location corresponding to the length blen from the address baddr in said application buffer.

6. The TCP buffer copy distributed parallel processing apparatus according to claim 4, wherein When the buffer copying process is completed, said TCP buffer copying section notifies to said socket processing section, the buffer copy completion notice which contains the data length of the copied data and a TCP parameter rcv_nxt of the received packet after a TCP protocol process notified from said TCP reception processing section,
   said application buffer has a buffer region for a length blen from an address baddr as a copy destination region, and
   said socket processing section refers to the TCP parameter rcv_nxt which is contained in the buffer copy completion notice, and determines whether or not the buffer copy request is notified to all the regions in said application buffer, based on a value of the TCP parameter.

7. The TCP buffer copy distributed parallel processing apparatus according to claim 6, wherein said TCP reception processing section determines whether or not the buffer copy request to be notified out contains the last data to fill said application buffer, based on TCP parameter rcv_nxt, and notifies a dummy buffer copy request which contains a link sequence number of a cycle, to all of said TCP buffer copying sections which the buffer copy request is not yet notified in the cycle of distribution, when the buffer copy request is determined to contain the last data, each of said TCP buffer copying sections notifies the buffer copy completion notice to said socket processing section, the buffer copy completion notice notified from $I^{th}$ ($1 \leq I \leq N$) one of said TCP buffer copying sections to said socket processing section contains a link sequence number Lseq(I) indicating the number of times of distribution, and said socket processing section determines whether or not the packet data are copied to all the regions in said application buffer, based on the buffer copy completion notices, and determines that the buffer copy processes of said TCP buffer copying sections are completed, when it is determined that the buffer copy request is notified to all the regions in said application buffer and the link sequence numbers of the buffer copy completion notices from said TCP buffer copying sections are all same.

8. The TCP buffer copy distributed parallel processing apparatus according to claim 1, wherein said TCP reception processing section selects said TCP buffer copying section as a notification destination of the buffer copy request from among said TCP buffer copying sections by a round robin method.

9. The TCP buffer copy distributed parallel processing apparatus according to claim 1, wherein when the buffer copying process is completed, said TCP buffer copying section notifies a buffer copy completion notice which includes a data length of a copied data, to said socket processing section, said application buffer has a buffer region for a length blen from an address baddr as the copy destination region, and said socket processing section sums the data lengths of the copied data which are contained in said buffer copy completion notices, and whether the buffer copy request is issued to all the regions of said application buffer is determined based on whether the summed result has reached a position corresponding to the length blen from the address baddr in said application buffer.

10. The TCP buffer copy distributed parallel processing apparatus according to claim 9, wherein the buffer copy completion notice notified from an $I^{th}$ ($1 \leq I \leq N$) one of said TCP buffer copying sections to said socket processing section contains a link sequence number Lseq(I) indicating the number of times of distribution, and said socket processing section determines that the buffer copy processes of all said TCP buffer copying section are completed, when it is determined that the buffer copy request is notified to all the regions of said application buffer, and the buffer copy completion notice used for the determination is for $I^{th}$ distribution by the round robin method, and when the following two conditions are satisfied:

(a) Lseq(1), . . . , Lseq(I−1)==Lseq(I), (b) Lseq(I+1), . . . , Lseq(N)==Lseq(I)−1.

11. The TCP buffer copy distributed parallel processing apparatus according to claim 1, wherein when the buffer copying process is completed, said TCP buffer copying section notifies to said socket processing section, the buffer copy completion notice which contains the data length of the copied data and a TCP parameter rcv_nxt after a TCP protocol process of the received packet notified from said TCP reception processing section, said application buffer has a buffer region for a length blen from an address baddr as a copy destination region, and said socket processing section refers to the TCP parameter rcv_nxt which is contained in said buffer copy completion notice and determines whether or not the buffer copy request is notified to all the regions in said application buffer, based on the value of the TCP parameter rcv_nxt.

12. The TCP buffer copy distributed parallel processing apparatus according to claim 11, wherein the buffer copy completion notice notified from $I^{th}$ ($1 \leq I \leq N$) one of said TCP buffer copying sections to said socket processing section contains a link sequence number Lseq(I) indicating the number of times of distribution, and said socket processing section determines that the buffer copy processes of all said TCP buffer copying section are completed, when it is determined that the buffer copy request is notified to all the regions of said application buffer, and the buffer copy completion notice used for the determination is for $I^{th}$ distribution by the round robin method, and when the following two conditions are satisfied:

(a) Lseq(1), . . . , Lseq(I−1)=Lseq(I), (b) Lseq(I+1), . . . , Lseq(N)==Lseq(I)−1.

13. A TCP buffer copy distributed parallel processing method comprising:

carrying out a TCP protocol process to received packets;

determining whether or not the received packets are in-order that packets are received in the same order as a transmission order from a counter host;

storing the received packets in an in-order queue provided in a reception packet buffer when the received packets are determined to be in-order;

determining copy destination regions in an application buffer based on a TCP sequence numbers of the received packets;

generating a buffer copy request to copy the received packets from said reception packet buffer into said application buffer;

performing buffer copy processes of the received packets by ones selected from said TCP buffer copying sections distributedly in parallel by notifying the buffer copy request to said selected TCP buffer copying sections; and when the received packets are determined to be out-of-order that the packets are received in an order different from the transmission order from said counter host, storing the received packets in an out-of-order queue.

14. A Non-transitory computer-readable recording medium in which a computer-readable program is recorded to realize a TCP buffer copy distributed parallel processing method, wherein said method comprises:

carrying out a TCP protocol process to received packets;

determining whether or not the received packets are in-order that packets are received in the same order as a transmission order from a counter host;

storing the received packets in an in-order queue provided in a reception packet buffer when the received packets are determined to be in-order;

determining copy destination regions in an application buffer based on a TCP sequence numbers of the received packets;

generating a buffer copy request to copy the received packets from said reception packet buffer into said application buffer;

performing buffer copy processes of the received packets by ones selected from said TCP buffer copying sections distributedly in parallel by notifying the buffer copy request to said selected TCP buffer copying sections; and when the received packets are determined to be out-of-order that the packets are received in an order different from the transmission order from said counter host, storing the received packets in an out-of-order queue.

* * * * *